US008860371B2

(12) United States Patent
Yang

(10) Patent No.: US 8,860,371 B2
(45) Date of Patent: Oct. 14, 2014

(54) SERIES BATTERY CHARGER WITH THE FUNCTION OF SEPARATE DETECTION

(75) Inventor: Fu-I Yang, Taoyuan County (TW)

(73) Assignee: Samya Technology Co., Ltd., Taoyuan County (TW)

( * ) Notice: Subject to any disclaimer, the term of this patent is extended or adjusted under 35 U.S.C. 154(b) by 618 days.

(21) Appl. No.: 13/164,902

(22) Filed: Jun. 21, 2011

(65) Prior Publication Data

US 2012/0249071 A1    Oct. 4, 2012

(30) Foreign Application Priority Data

Apr. 1, 2011    (TW) .............................. 100111916 A

(51) Int. Cl.
*H02J 7/00*    (2006.01)

(52) U.S. Cl.
CPC ....... *H02J 7/0024* (2013.01); *H02J 2007/0062* (2013.01); *H02J 7/0054* (2013.01); *H02J 7/0055* (2013.01); *Y02T 10/7055* (2013.01)
USPC .......................................... 320/116; 320/113

(58) Field of Classification Search
CPC ...... H02J 7/0013; H02J 7/0016; H02J 7/0018
USPC .................. 320/116, 118, 119, 110, 113, 128
See application file for complete search history.

(56) References Cited

U.S. PATENT DOCUMENTS

| | | | |
|---|---|---|---|
| 6,784,638 B2 * | 8/2004 | Yang .............................. | 320/119 |
| 7,068,011 B2 * | 6/2006 | Yang .............................. | 320/119 |
| 7,777,451 B2 * | 8/2010 | Chang et al. ................... | 320/118 |
| 7,782,013 B2 * | 8/2010 | Chang ............................ | 320/116 |
| 7,821,231 B1 * | 10/2010 | Chang et al. ................... | 320/126 |
| 7,825,632 B1 * | 11/2010 | Chang ............................ | 320/135 |
| 8,159,191 B2 * | 4/2012 | Chang et al. ................... | 320/136 |

* cited by examiner

*Primary Examiner* — Edward Tso
*Assistant Examiner* — Ramy Ramadan
(74) *Attorney, Agent, or Firm* — Rosenberg, Klein & Lee

(57) ABSTRACT

A series battery charger with the function of separate detection, and more particularly a series circuit for detecting the battery charging process and for conducting a series combined discharging process on the same battery charger. The present invention provides a circuit structure capable of selectively switching to an "separate detection charging and series combined discharging mode" and a "synchronous switching control charging and discharging mode" by a synchronous changeover switch module in conjunction with charging circuits. In this way, the stored electric energy can be released for use by the series-connected separate detection charging circuits. Moreover, the charger can deliver 5V power via the standard USB interface to the 3C electronic products for the charging purpose. Meanwhile, the problems of conventional AA or AAA battery chargers and lithium batteries designed as a portable power are overcome, thereby enhancing the effect and safety of the charger.

10 Claims, 21 Drawing Sheets

SERIES BATTERY CHARGER WITH THE FUNCTION OF SEPARATE DETECTION

BACKGROUND OF THE INVENTION (a) Field of the Invention

The present invention relates to a series battery charger, and more particularly to a charger designed for charging, discharging and supplying electric power to an AA or AAA rechargeable battery, and a synchronous changeover switch module is provided to integrate a circuit structure with "a separate detection charging circuit and a series combined discharging circuit".

(b) Description of the Related Art

As portable 3C electronic products become increasingly more popular, the demand for batteries becomes increasingly higher as well. A disposable battery (or a primary battery) is discarded after use, not only increasing the cost, but also causing environmental pollutions. Therefore, a rechargeable battery (or a secondary battery) has a higher consumption than that of the primary battery since the rechargeable battery can save costs and reduce contaminations of waste batteries.

At present, the rechargeable battery includes lithium-ion (Li-ion) battery, nickel metal hydride (Ni-MH) battery, nickel cadmium (Ni—Cd) battery and the rechargeable alkaline battery, and these batteries are also known as secondary batteries. Recently, a lithium battery with an organic electrolytic unit is used extensively in portable electronic devices due to its features of high-capacity density, low temperature, and stable storage.

However, the lithium battery still has the following drawbacks in its use:

1. The lithium battery usually comes with a different specification for each of the electronic products. Even for the electronic products of the same brand, such as the Nokia mobile phones, there are tens of models of the lithium batteries, and thus causing tremendous inconvenience and trouble to users.

2. The lithium battery contains an electrolytic unit, and there is a safety concern such as possible explosion occurred when a current is passed.

3. Most of the present portable powers use a built-in lithium battery as an energy storage unit, but it generally does not come with a standard size for general electronic consumer products. As a result, the fully charged battery cannot be used alone when it is removed. Even though it can be removed, there are so many specifications of the lithium batteries, and such application is impractical.

Compared with the lithium battery, although the secondary battery such as the nickel metal hydride (Ni-MH), nickel cadmium (Ni—Cd) or alkaline rechargeable secondary battery has an energy storage density less than that of the lithium battery, yet its widely used AA or AAA battery sets an industrial specification, which is the main reason of its popularity up to now. However, its use still has the following insufficiencies:

1. As shown in FIG. 1, which illustrates a charging circuit of a conventional parallel charger, the batteries B1~B4 connected in parallel are charged by the charging circuit. The advantage lies in that each of the batteries obtains a roughly the same charging voltage. The user can be free of the problem with batteries that are overcharged or undercharged. However, the disadvantage of the parallel charging mode is that the batteries can't be rapidly charged. Each of the batteries has only 1.2~1.5V. When they are used/discharged for the 3C electronic products, they have to be connected in series for obtaining the DC voltage of (1.2V~1.5V)×4=4.8V~6V. It is complicated to discharge the parallel-connected batteries in a series way. Moreover, the problems such as power consumption, voltage difference and overheat have to be overcome.

2. As shown in FIG. 2, which illustrates a charging circuit of a conventional series charger, the batteries B1~B4 connected in series are charged by the same charging circuit. The advantage is that the structure is simple and the batteries can be rapidly charged. However, this application may have drawbacks such as overheat, leak and undercharge.

3. In order to improve the above-mentioned charging circuit, the applicant of the invention disclosed a solution of U.S. Pat. No. 6,784,638 "Series Charger with Separate Detection of Batteries" with which a plurality of batteries connected in series can be charged. In addition, a control IC and a separate detection circuit are employed to conduct the detection control of each battery. In this way, the problems of the series charger and the parallel charger may be eliminated. By use of this series charger with separate detection of batteries, the batteries each can be charged and detected if they are fully charged. However, it is not possible as well to discharge the batteries in a series mode for the 3C electronic products. This requires further improvements.

SUMMARY OF THE INVENTION

Therefore, it is a primary object of the present invention to provide a series battery charger with the function of separate detection, and more particularly a series circuit for detecting the battery charging process and for conducting a series combined discharging process on the same battery charger. The present invention provides a circuit structure capable of selectively switching to a "separate detection charging and series combined discharging mode" and a "synchronous switching control charging and discharging mode" by a synchronous changeover switch module in conjunction with charging circuits. In this way, the stored electric energy can be released for use by the series-connected separate detection charging circuits. Moreover, the charger can deliver 5V power via the standard USB interface to the 3C electronic products for the charging purpose. Meanwhile, the problems of conventional AA or AAA battery chargers and lithium batteries designed as a portable power are overcome, thereby enhancing the effect and safety of the charger.

Another object of the present invention is to provide a series battery charger with the function of separate detection by which the output discharging current is automatically blocked in charging the batteries within the charging block when the charging/discharging circuits are changed. In this way, the charging process will not be interfered by the output circuit. Moreover, the charging circuit is automatically disconnected in the discharging mode such that the discharging process will not be interfered. Thus, the charging/discharging quality is ensured.

A further object of the present invention is to provide an series battery charger with the function of separate detection, serving as a charger when a battery is charged in an independent separate charging mode and removed from the charger for the use by an electronic product, or serving as a discharger when a synchronous changeover switch module is switched to a series-connected and combined discharging mode, and a stabilized DC power is outputted for charging a portable electronic product, or serving as an adaptor by supplying a DC charging power when there is no battery placed in the charger or the power of an electronic device is low. In addition, the battery charger becomes a portable power when it is carried out, such that when the power of an electronic device is low, the charger can serve as a backup secondary battery.

Even one alkaline primary battery can be placed in the battery charger for the discharging, and thus the battery charger also serves as an emergency power supply.

In order to achieve the above-mentioned objects, the invention includes:

a casing, for containing a charging component, and having a charging block disposed on a surface of the casing, a plurality of charging compartments formed in the charging block for placing a plurality of AA or AAA batteries respectively, and an end of the charging compartment being a positive terminal, and the other end of the charging compartment being a negative terminal, thereby creating a charging circuit, and the casing having a plug connectable to an external power source;

an input power source provided for converting an AC or DC power to a DC power and supplying a reference voltage source to a control IC (integrated circuit), a current control unit and a voltage control unit being interposed between the input terminal of the control IC and the input power source, thereby creating a charging circuit for charging the batteries in the charging block;

the batteries within the charging block connected in series, each of the charging circuits being connected in parallel with a switch element, an anti-adverse-current element being interposed between the switch element and the positive terminal of the battery, wherein the control IC separately applies a terminal voltage to the positive terminals of the batteries of the charging circuits for the purpose of detection such that the switch elements of the charging circuits are switched ON when the batteries are fully charged, whereby the charging current Ic can be used for a further (or downward) charging process;

a synchronous changeover switch module provided for switching the charging circuits in the series charging mode or the discharging mode, the synchronous changeover switch module having a number (n−1) of switching units (SW1~SWn−1) corresponding to (n) charging circuits in the charging block such that a switching unit is respectively interposed between two series-connected charging circuits, and wherein the last switching unit (SWn) of the synchronous changeover switch module is an independent charging/discharging control unit, and wherein each of the switching units (SW1~SW4) has three contacts (a, b, c), and wherein the contact (a) of the switching units (SW1~SWn−1) is connected to the switch element of the corresponding charging circuits and to the front end of the anti-adverse-current element of the next charging circuits, and wherein the contact (b) is respectively connected to the positive terminal of the battery of the next charging circuit, and wherein the contact (c) is electrically connected to the negative terminal of the battery of the corresponding charging circuit, and wherein the contact a of the switching unit (SWn) serving as the charging/discharging control unit is a charging control terminal while the contact (b) thereof is a discharging control terminal, and the contact (c) thereof is a power control terminal (CONTROL H/L) for connection to the input power source or for grounding, and wherein the contact (c) is electrically connected to one of the contacts (a, b) when the synchronous changeover switch module is switched to one of the charging and discharging modes;

a charging control circuit (A), composed of a contact a and a contact c of the charging/discharging control unit, and electrically coupled to the input power source, for controlling the ON/OFF of the input power source or outputting a charging power to the charging block;

a discharging control switch (E), comprising an input terminal, an output terminal and a control terminal, the input terminal being coupled to a positive of the first charging circuit/compartment in the terminal the charging block, and the output terminal being coupled to a voltage regulator circuit, and the control terminal being electrically coupled to a contact b of the charging/discharging control unit, for controlling the ON/OFF of the input terminal and the output terminal, such that the series-connected and combined discharging current of each battery in the charging block is outputted to the voltage regulator circuit;

the voltage regulator circuit, for boosting or stepping down the input power to a predetermined DC voltage; and at least one USB output port, coupled to an output terminal of the voltage regulator circuit;

whereby, when the synchronous changeover switch module switches to a charging mode, each contact (c) and each contact (a) of all n sets of switching units (SW1~SWn) are turned ON synchronously, such that each battery on the charging circuit is in an series-connected separate detection charging mode, and the discharging control switch E is turned OFF synchronously, and the charging control circuit (A) is controlled to turn (ON) to charge each battery by the charging current, and when the synchronous changeover switch module switches to a discharging mode, each contact (c) and each contact (b) of all sets of switching units (SW1~SWn) are turned ON synchronously, such that each batter on the charging circuit is in a series-connected combined synchronous discharging mode, and the charging control circuit (A) is turned OFF and the discharging control switch (E) is turned ON synchronously, such that each battery is series-connected to output the discharging current, so as to form a synchronous changeover switch module capable of integrating the independent separate charging or the series-connected and combined discharging between the charging and discharging circuits and synchronously controlling the ON/OFF of the charging current and discharging current.

According to the above-mentioned technical features, the synchronous changeover switch module is constructed as a mechanic type switch or an electronic type switch, and wherein the mechanic type switch can be a slide switch, a press-button switch or a differential switch, and wherein the electronic type switch can be MOSFET or logic circuit while the control IC 22 is used to control the ON/OFF state of the discharge control switch (E), and wherein the discharge control switch (E) is switched OFF to stop the discharging process when the discharge termination voltage of the batteries is detected/discovered by the control IC.

According to the above-mentioned technical features, each switching unit of the mechanic type switch includes at least three pins, and wherein the synchronous changeover switch module includes a switchable isolation operation interface 31 on the main body thereof, and wherein the isolation operation interface 31 is exposed on the surface of the casing, and wherein, when the isolation operation interface 31 of the mechanical switch conducts the switching process, a number (n) of the independent conductive terminals 32 at the bottom thereof is synchronously shifted, and wherein one end of the conductive terminals is constantly and electrically connected to the corresponding contact (c) while the other end thereof is electrically connected to one of the contacts (a, b).

According to the above-mentioned technical features, the operation modes of the charger include:
   a) under the condition of having an external power source:
      i) when the synchronous changeover switch module switches to the charging mode, the plurality of rechargeable batteries in the charging block forms series-connected separate detection charging circuits, and the charging/discharging control unit synchronously controls the charging control circuit (A) to turn ON and the discharging control switch (E) to turn OFF, so as to constitute a battery charger;
ii) when the synchronous changeover switch module switches to the discharging mode, each battery of the charging block forms a series-connected combined synchronous discharging circuit, and the charging/discharging control unit synchronously controls the charging control circuit (A) to turn OFF and the discharging control switch (E) to turn ON, such that the series-connected discharging current is outputted through the voltage regulator circuit for stabilizing the voltage, and then the USB output port supplies an electric power, so as to form a discharger;

According to the above-mentioned technical features, the input power source further is further externally coupled to an auxiliary power supply, and the auxiliary power supply is coupled to the voltage regulator circuit for stabilizing the input power source and then supplying the power to the USB output port, such that the charger can charge the batteries concurrently, independently and separately and can output a USB power at the same time, so as to form a dual function device with the functions of a charger and an adaptor, and capable of charging a battery and supplying an electric power to an electronic product concurrently.

According to the above-mentioned technical features, the input power source is further externally coupled to an auxiliary power supply, and the auxiliary power supply is coupled to the voltage regulator circuit for stabilizing the input power source and then supplying the power to the USB output port, such that if no battery is placed into the charger for charging, a USB power can be outputted, so as to form an adaptor device for supplying an electric power to an electronic product directly.

b) under the condition of having no external power source:
i) when the synchronous changeover switch module switches to the charging mode, each charging circuit has no charging current, and the charger is in a non-using status; and
ii) when the manual switch switches to the discharging mode, a charged backup secondary battery or a primary battery installed in the charging block forms a series-connected and combined discharging circuit, and the charging/discharging control unit synchronously controls the discharging control switch (E) to tur4n ON, such that the series-connected and combined discharging current is stabilized by the voltage regulator circuit, and then the USB output port supplies an electric power to a portable electronic product, so as to form a portable power or an emergency power supply.

According to the forgoing techniques, the present invention is provided and integrated with the switching modes of the synchronous changeover switch module for constituting a circuit structure featuring an separate detection charging and series combined discharging mode" and a "synchronous switching control charging and discharging mode" without increasing the volume of the charger so as to overcome the problems of conventional chargers for nickel metal hydride batteries and nickel cadmium batteries and the problems of lithium batteries designed as a portable power, and to enhance the effect and safety of the charger.

DETAILED DESCRIPTION OF THE PREFERRED EMBODIMENT

Figure 1:
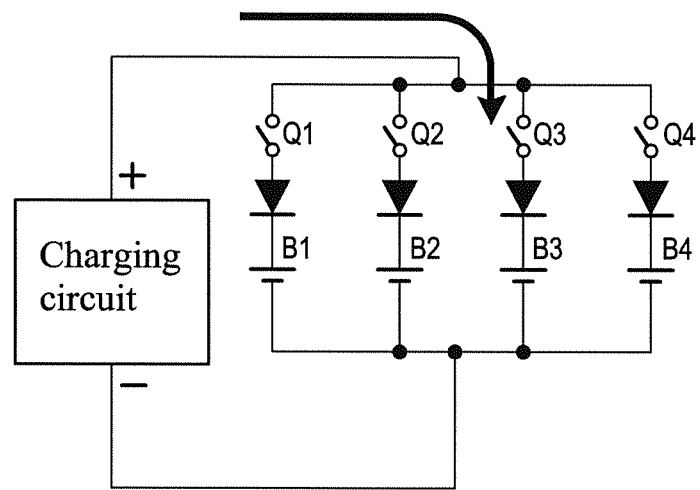
FIG. 1 is a charging circuit of a conventional parallel charger.
Figure 2:
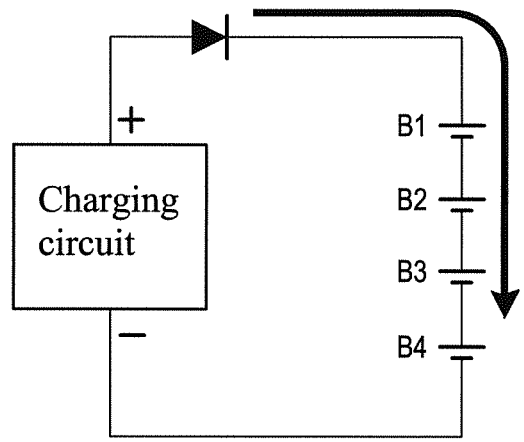
FIG. 2 is a charging circuit of a conventional series charger.
Figure 3:
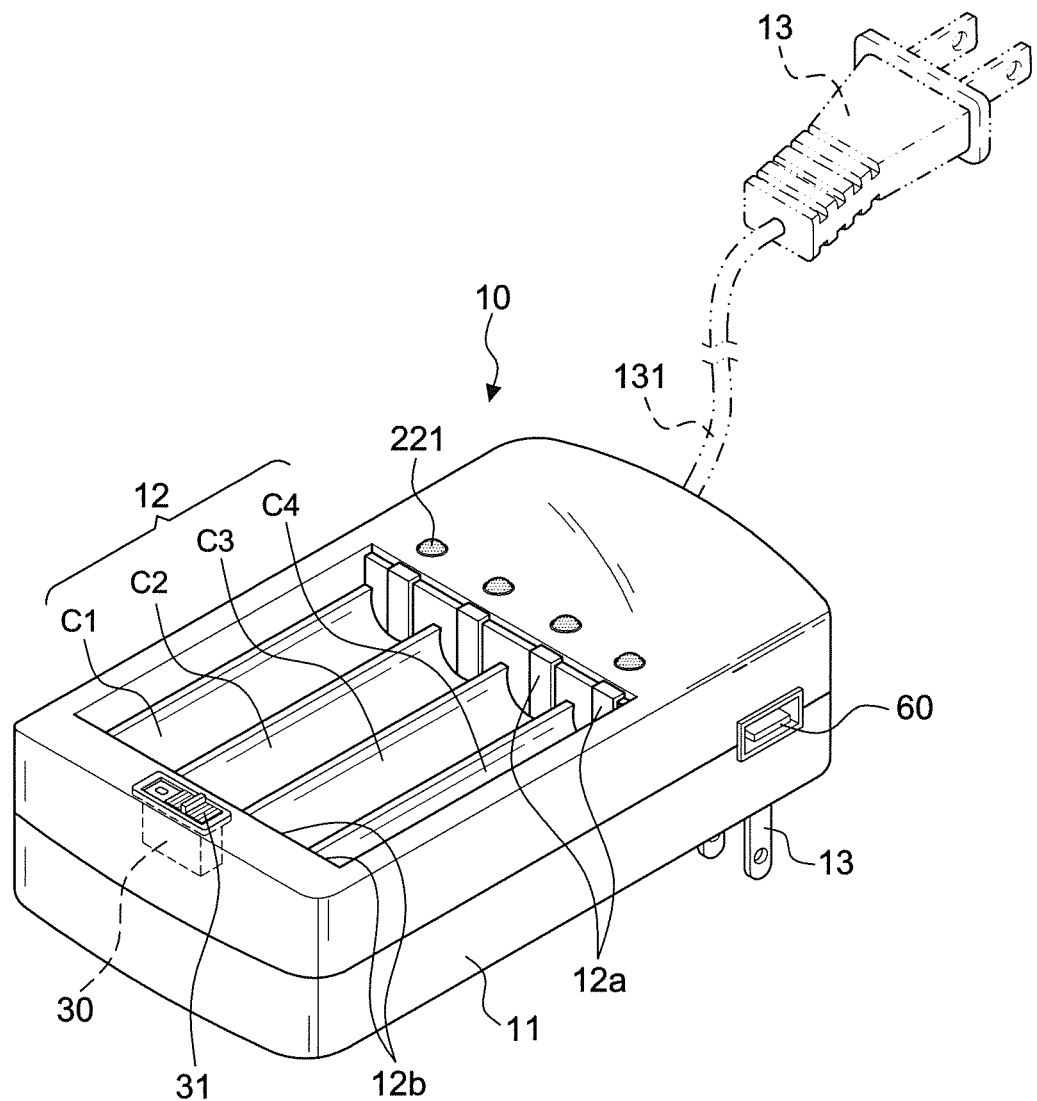
FIG. 3 is a perspective view of the present invention.

With reference to FIG. 3 for a perspective view of a battery charger 10 of the present invention, the charger 10 comprises: a casing 11, for containing and covering charging components (such as a switching power supply and a charging circuit), and a charging block 12 disposed on a surface of the casing 11 and having a plurality of charging compartments provided for placing a plurality of AA or AAA batteries B1~B4 therein. In this preferred embodiment, there are four charging compartments C1, C2, C3, C4, but the invention is not limited to such quantity only. In a small charger, there are two charging compartments. Four charging compartments are used as an example for the description of a preferred embodiment and the illustration of its related drawings as follows. The casing 11 further comprises a plug 13 connectible to an external power source, wherein the plug 13 of this preferred embodiment is foldable and disposed at the bottom of the casing 11. Of course, an external power cable 131 or a replaceable plug 13 can be used for connecting the external power source instead.

The charging block 12 as shown in FIG. 3 may further have an external cover. In addition, the casing 10 includes a plurality of display units 221 which may be LEDs for displaying a charging status of each charging compartment C1~C4. Each charging compartment has a positive terminal 12a and a corresponding negative terminal 12b.

Figure 4:
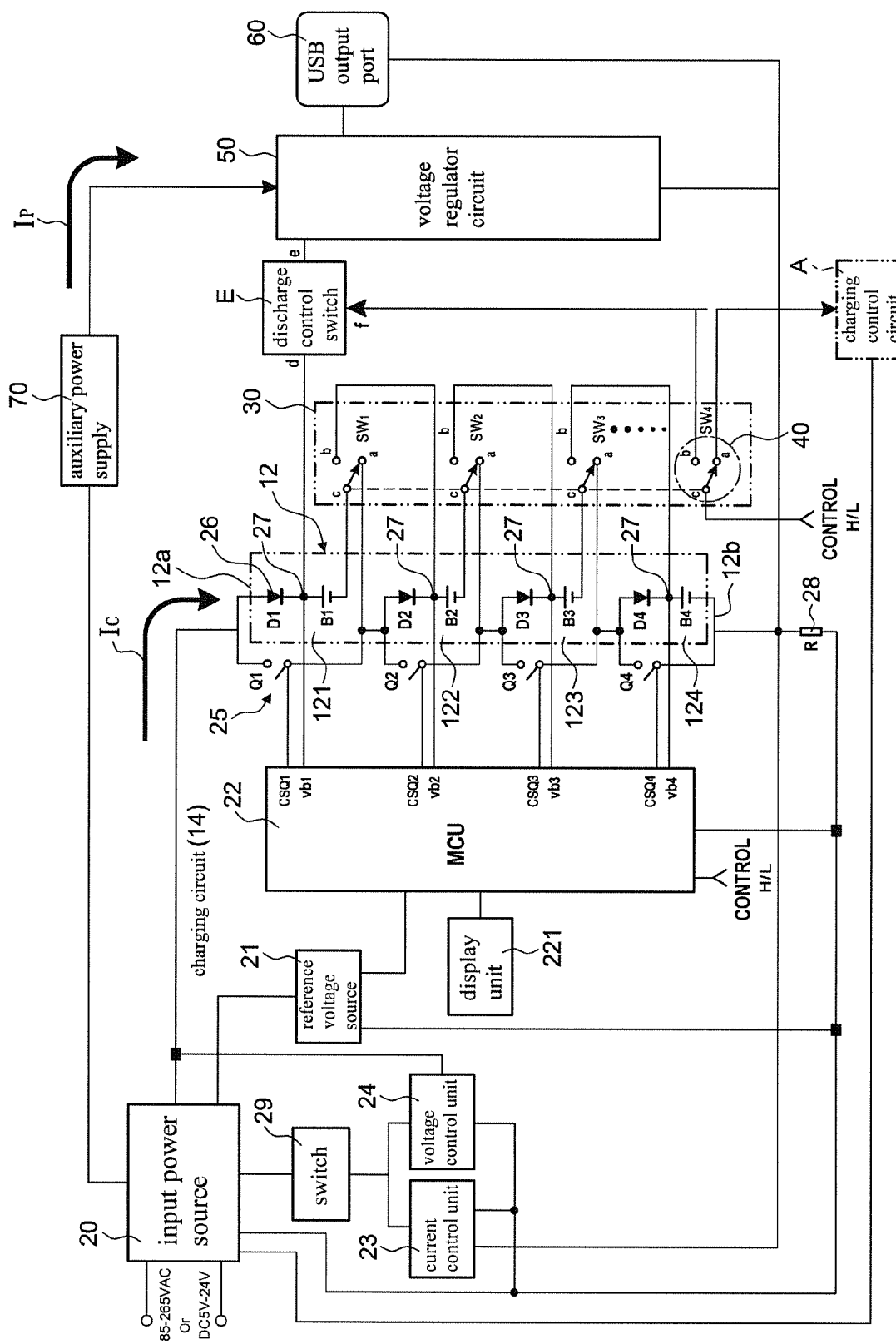
FIG. 4 is a schematic circuit diagram of a preferred embodiment of the present invention.

With reference to FIG. 4 for a schematic circuit diagram of a preferred embodiment of the present invention, most of the components in this circuit structure are contained in the casing 11, and only a small number of components are exposed from a surface of the casing 11, and the circuit structure comprises the following elements:

An input power source 20 is provided for converting an AC or DC power to a DC power and supplying a reference voltage source 21 to a control IC (integrated circuit) 22 for charging the batteries in the charging block 12. The control IC 22 is a controller MCU of a microcomputer, and each component of the charging circuit 14 is operated by executing a predetermined sequence of procedures.

A current control unit 23 and a voltage control unit 24 are interposed between the input terminal of the control IC 22 and the input power source 20, and a switch 29 is installed between them. The charging circuit 14 composed of the foregoing components is a prior art, and thus will not be described here.

A current detection component 28 is coupled to a negative terminal of the charging block 12, and the current detection component 27 can be a resistor R and coupled to the current and voltage control units 23, 24 for detecting current by the charging of the charging block 12 and using it as a voltage feedback current control to make adjustments.

As shown in FIG. 3, the charging compartments C1~C4 of the charging block 12 are connected in parallel. As shown in FIG. 4, the charging compartments B1~B4 of the charging block 12 are connected in series. The positive and negative terminals of each charging compartment create a charging circuit. There are four charging circuits 121~124 provided in this embodiment. The charging circuits 121~124 each are connected in parallel with a switch element 25 such as MOSFET, but should not be limited thereto. In other words, four MOSFETs Q1~Q4 are provided in this embodiment. An anti-adverse-current element 26 is interposed between the switch element 25 and the positive terminal of the battery. The anti-adverse-current element 26 can be diode or MOSFET. According to the embodiment, four diodes D1~D4 serve as the anti-adverse-current element 26.

The control IC 22 separately applies a terminal voltage to the positive terminals of the batteries of the charging circuits 121~124 for the purpose of detection. As shown in FIG. 4, the point to detect the terminal voltage is marked with 27. The detection points 27 are electrically connected to the control IC 22 such that the switch elements 25 connected in parallel with the charging circuits 121~124 are switched in the ON-position when the batteries B1~B4 are fully charged. In this way, the charging current Ic can be used for a further (or downward) charging process. As a result, each batteries B1~B4 in series can be separately detected by the invention if they are fully charged.

The series charging circuit in accordance with the invention differs from the prior art in that the batteries each can be separately detected if they are fully charged when they are charged in a series-connected state and that they are changed into the discharge mode when they are fully charged. In order to achieve these effects, a circuit arrangement specially designed is required. According to the invention, a synchronous changeover switch module 30 is employed to achieve the expected effect of series combination discharge. In other words, the negative terminal of the battery B1 of the first charging circuit 121 in accordance with the invention is not directly connected to the positive terminal of the battery B2 of the second charging circuit 122. This also applies to the third and fourth charging circuits 123, 124. According to the invention, a synchronous changeover switch module 30 has to be interposed between the charging circuits 121~124 for conducting different switching functions.

Figure 9A:
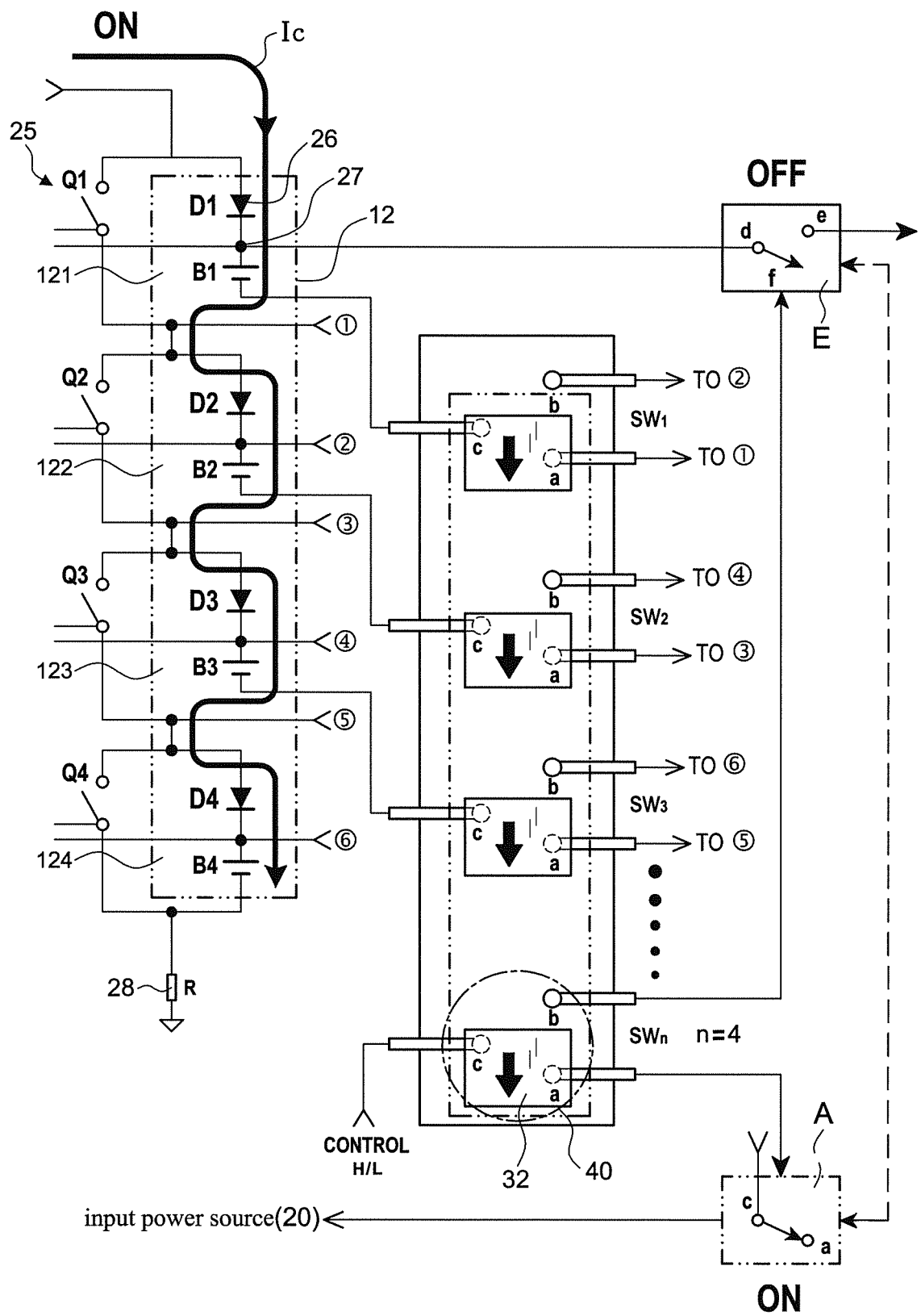
FIGS. 9A and 9B are schematic circuit diagrams showing a charging status and a discharging status of a synchronous changeover switch module in accordance with an embodiment of the present invention respectively.
Figure 9B:
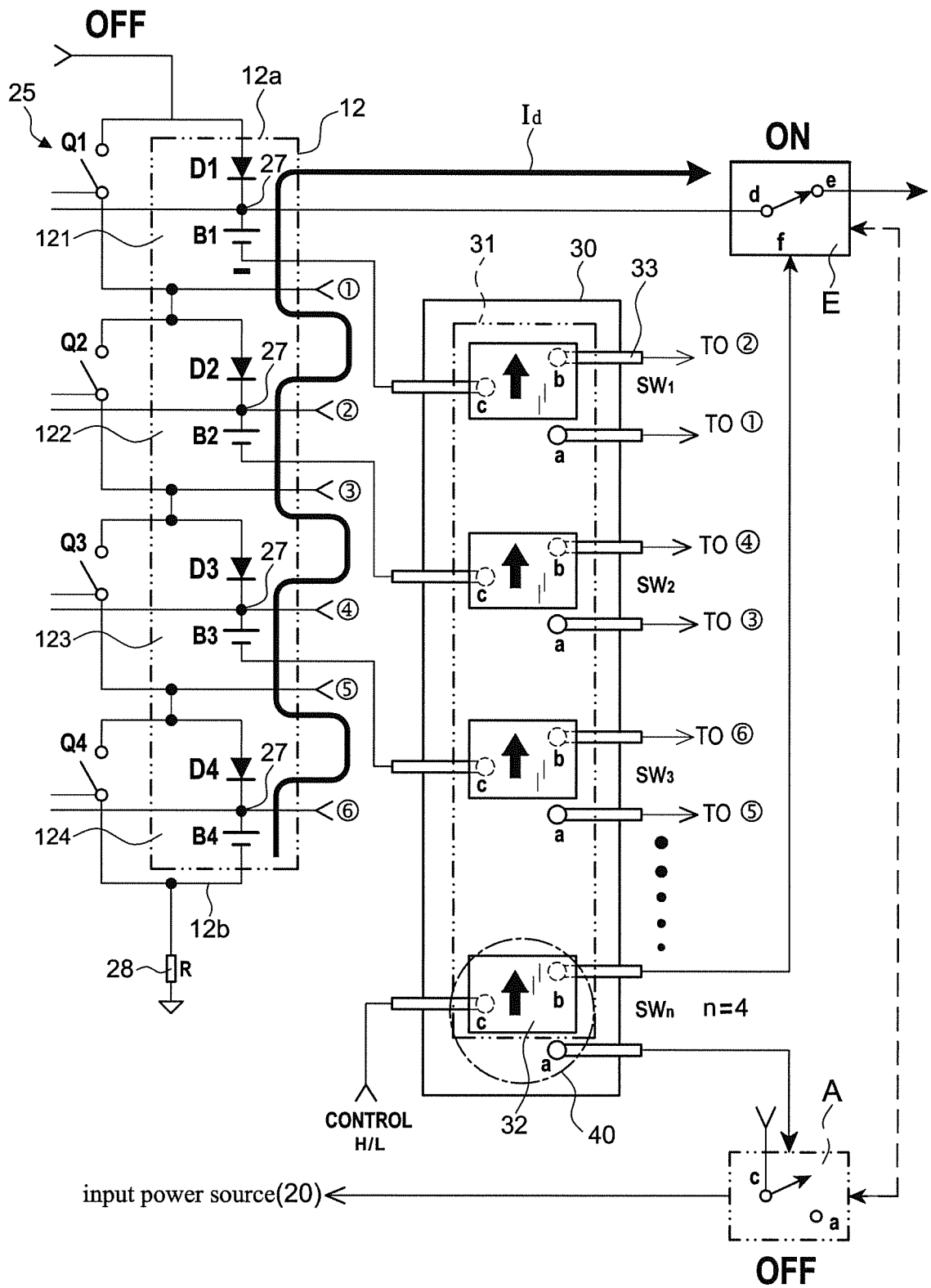

The synchronous changeover switch module 30 in accordance with the invention is constructed as a mechanic type switch or an electronic type switch. The mechanic type switch can be a slide switch, a press-button switch or a differential switch. The electronic type switch can be MOSFET or logic circuit while the control IC 22 is used to control the ON/OFF state of the discharge control switch E. No matter if the mechanic type switch or the electronic type switch is employed as the synchronous changeover switch module 30, the contacts a, b, c of the switching units SW1~SW4 of the synchronous changeover switch module 30 have the same connection way and the same synchronous switching control way. That is, the last switching unit SW4 is used as a charging/discharging control unit 40. As shown in FIGS. 9A and 9B, a mechanical type slide switch is used to be the synchronous changeover switch module 30. The slide switch belongs to the prior art so that he switching principle won't be described in details hereinafter. According to the invention, a two-stage multi-pin slide switch is designed for the above-mentioned purpose. In the embodiment of the invention, the synchronous changeover switch module 30 internally includes 12 contacts from which 12 pins 33 are extended. Three contacts constitute a unit, thereby creating four units of switching units SW1~SW4. Four conductive terminals 32 are movable with the isolation operation interface 31 such that the contact c is synchronously connected to all of the contacts a or b. Since the switching process is synchronously done without any time delay, the discharging and charging efficiency can be enhanced.

Figure 7A:
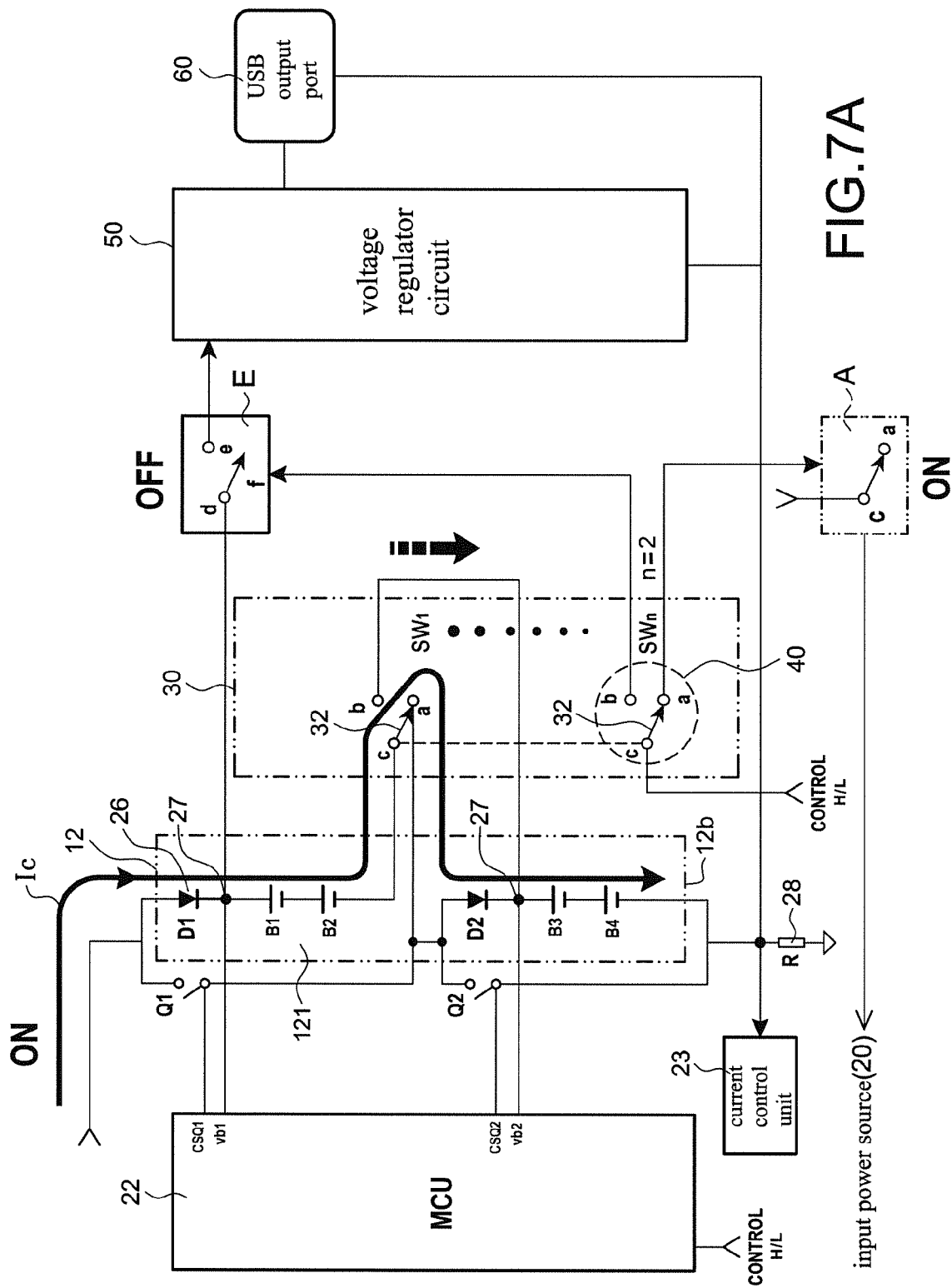
FIG. 7A is a schematic circuit diagram of two series-connected charging circuits.
Figure 7B:
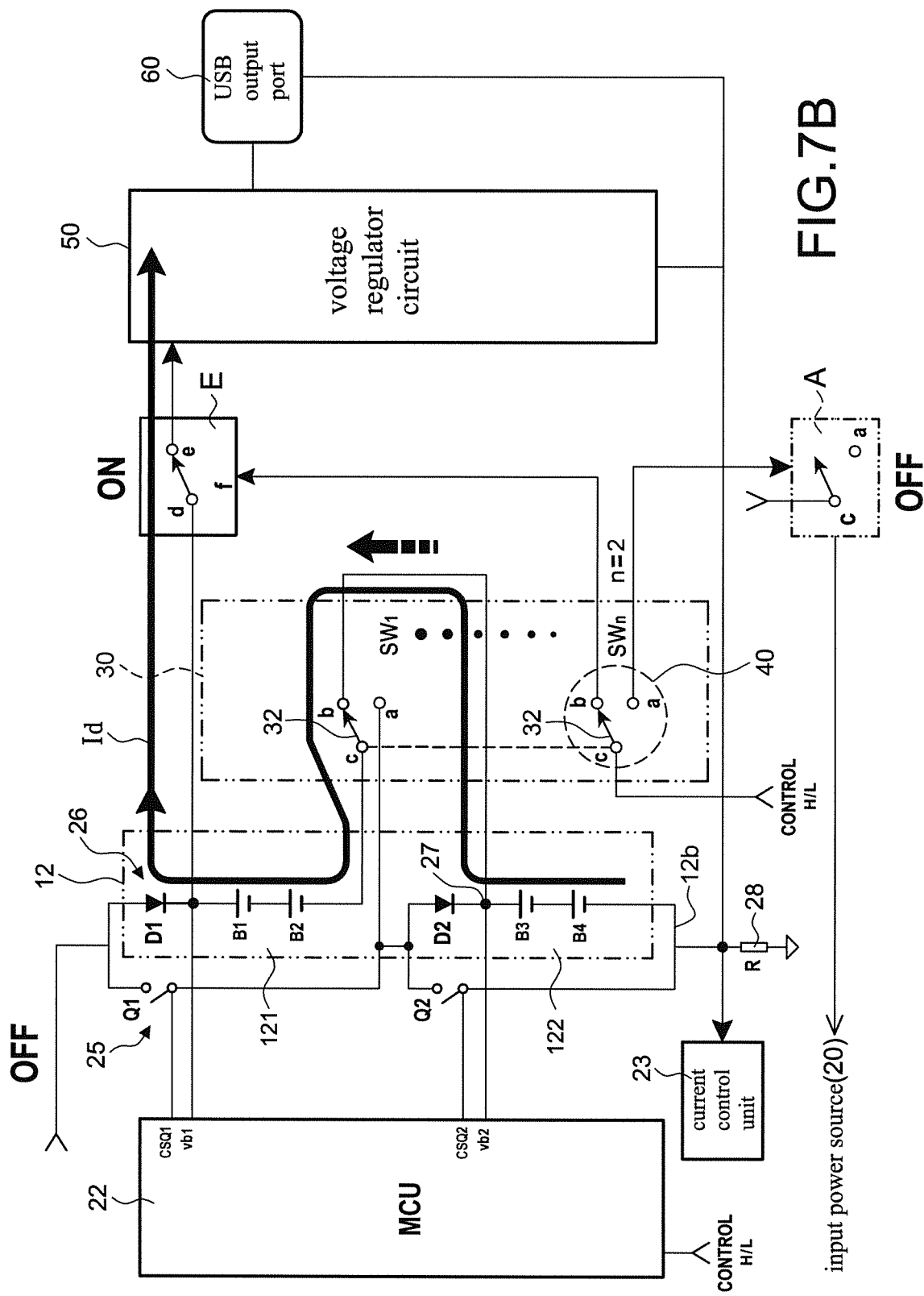
FIG. 7B is a schematic circuit diagram of two series-connected circuits in the discharging mode.
Figure 9C:
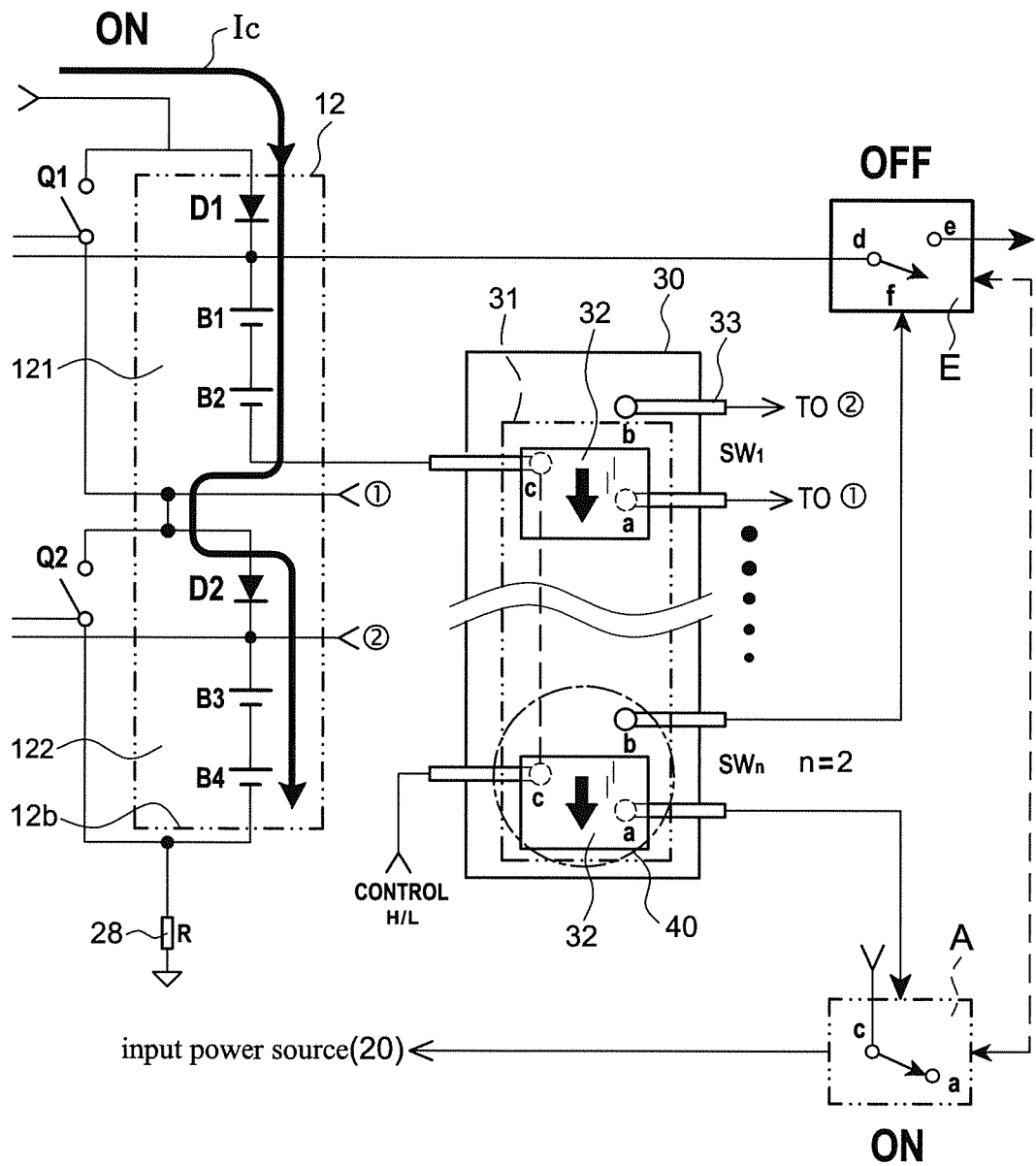
FIGS. 9C and 9D are schematic circuit diagrams showing a charging status and a discharging status of a synchronous changeover switch module in accordance with another embodiment the present invention respectively.
Figure 9D:
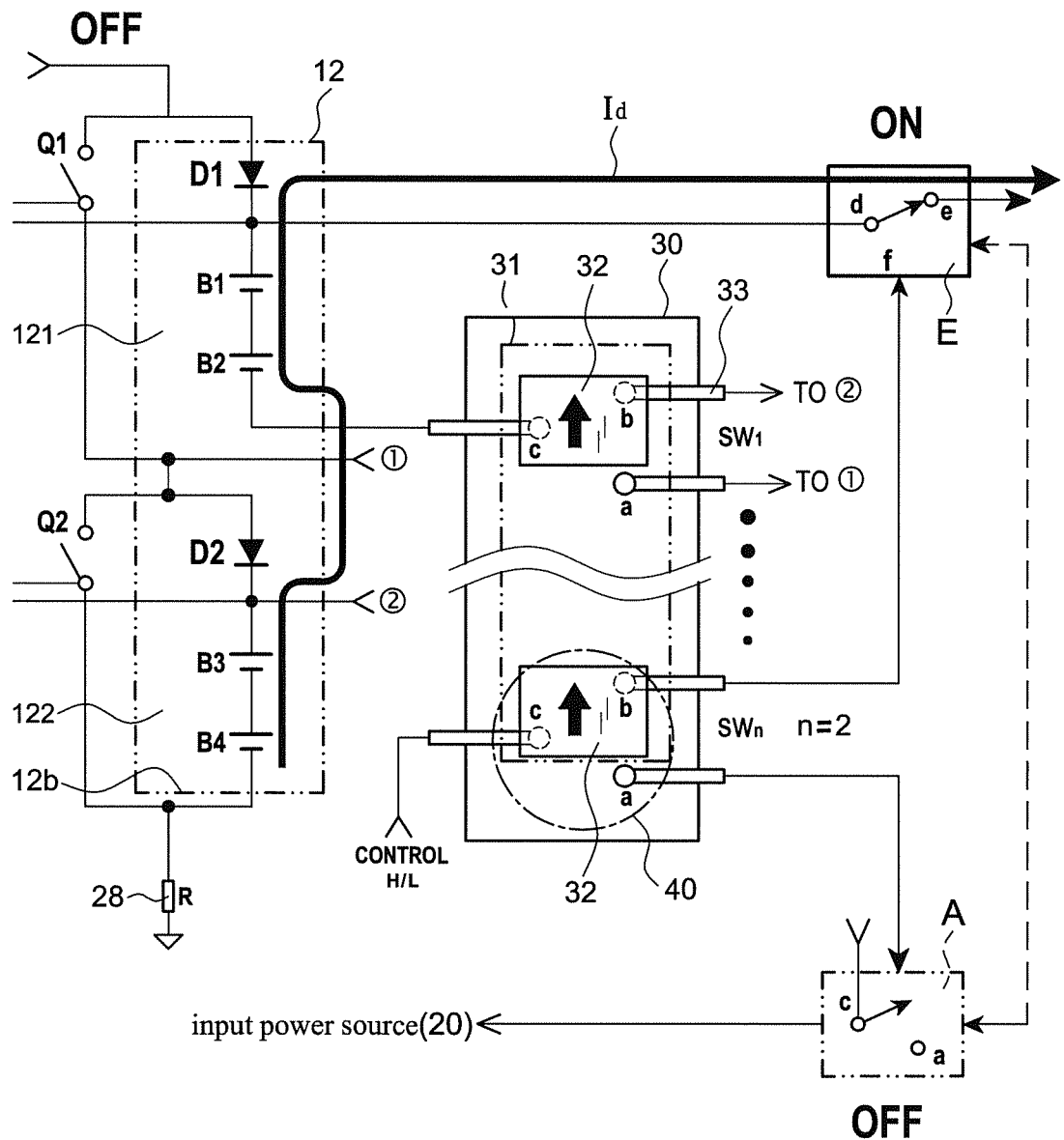

FIGS. 9A and 9B illustrate that the synchronous changeover switch module 30 has four switching units SW1~SWn, n=4. The number n of the switching units SW1~SW4 depends on the charging circuits 121~124. For example, there are n switching units SW1~SW4 correspondingly when n charging circuits 121~124 are provided. Moreover, the n-$^{th}$ switching unit SWn is the charging/discharging control unit 40. As a result, more than four charging circuits can be provided in the invention. That is, there can be eight charging circuits. As shown in FIGS. 7A and 7B as well as in FIGS. 9C and 9D, there can be only two charging circuits 121~122 to each of which two series batteries B1, B2; B3, B4 are coupled. Currently, there is a commercially available battery set having two batteries wrapped together by film. The required charging voltage for such a set of two batteries is the same or very close to each other since they have the same brand and are used for the same period of time. Thus, they can be arranged at the same charging circuit. In this case, the synchronous changeover switch module 30 has two switching units SW1~SWn, n=2. The n-th (second) switching unit SW2 is the charging/discharging control unit 40. The principle and the connection of contacts for the embodiment with two switching units SW1~SW2 are exactly the same as the aforementioned embodiment with four switching units SW1~SW4 so that no further descriptions in details are given hereinafter.

Figure 5A:
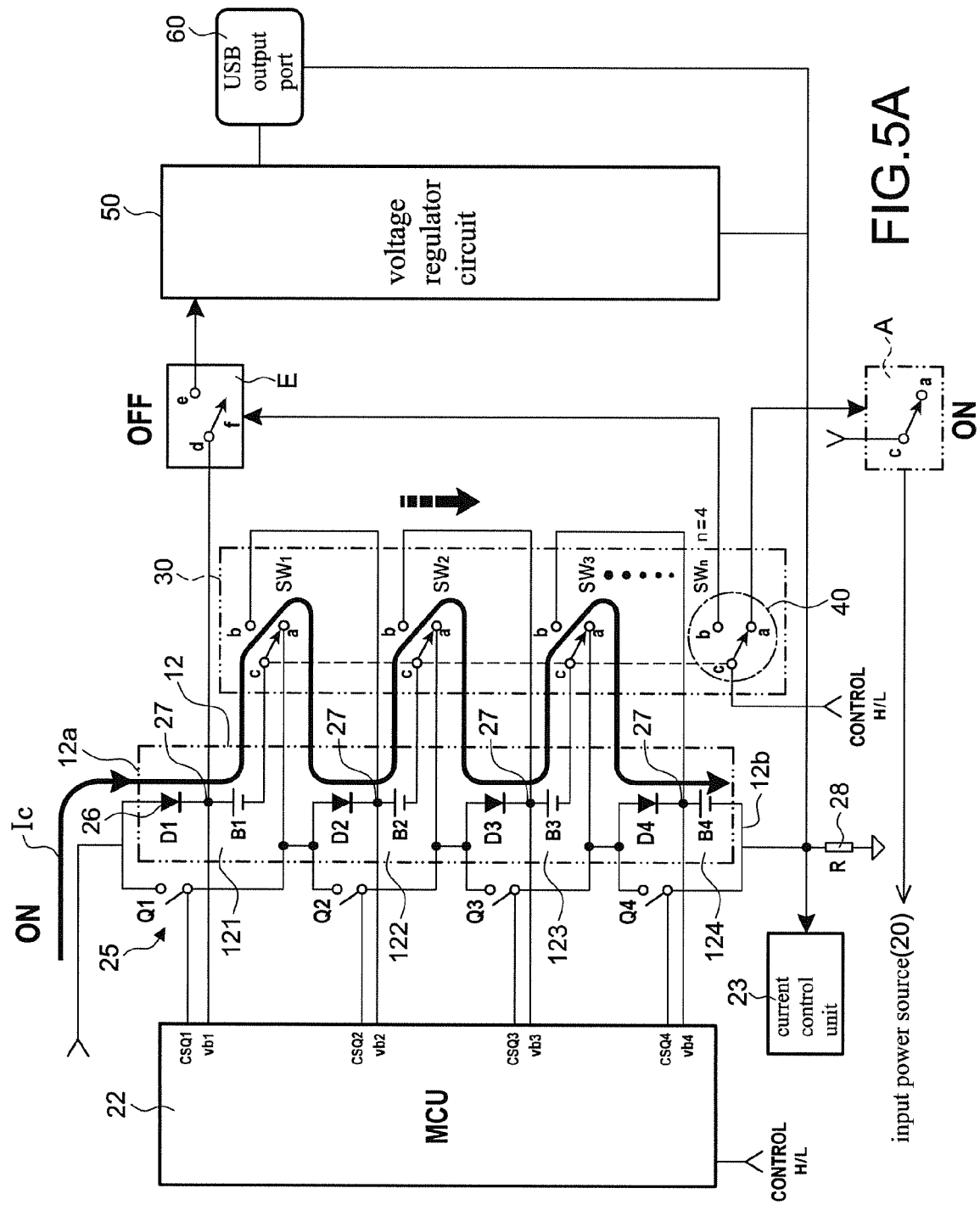
FIG. 5A is a schematic circuit diagram I the present invention in a separate detection mode.

How the synchronous changeover switch module 30 controls the connection and the disconnection of the charging circuits will be described hereinafter by means of the switching process of a mechanical type slide switch. The synchronous changeover switch module 30 includes a switchable isolation operation interface 31 on the main body thereof. The isolation operation interface 31 is exposed on the surface of the casing 11 (see FIG. 3). As shown in FIG. 5A, the synchronous changeover switch module 30 is internally provided with a number (n−1) of switching units SW1~SWn−1 corresponding to the charging circuits 121~12n (n=4) such that a switching unit is respectively interposed between two adjacent charging circuits, for example between the first and second charging circuits 121~122 while the last switching unit SWn of the synchronous changeover switch module 30 is an independent charging/discharging control unit 40. Moreover, each of the switching units SW1~SWn has three contacts a, b, c. The contact a of the switching units SW1~SWn−1 is electrically connected to the switch elements Q1~Q3 of the charging circuits 121~123 and the front end of the anti-adverse-current element D2~D4 of the next charging circuits. The contact b of the switching units SW1~SWn−1 is connected to the positive terminal of the battery of the next charging circuit. For example, the switching unit SW1 is connected to the positive terminal of the battery B2, and the switching unit SW3 is connected to the positive terminal of the battery B4. In addition, the contact c of the switching units SW1~SWn−1 is electrically connected to the negative terminal of the battery of the corresponding charging circuit 121~123. The negative terminal of the last charging circuit 124 is grounded. The contact a of the switching unit SWn serving as the charging/discharging control unit 40 is a charging control terminal while the contact b thereof is a discharging control terminal. The contact c thereof is a power control terminal (CONTROL H/L) for connection to the input power source 20 or for grounding, thereby creating a control circuit. As shown in FIGS. 9A and 9B, when the isolation operation interface 31 of the synchronous changeover switch module 30 conducts the switching process, a number (n) of the independent conductive terminals 32 at the bottom thereof is synchronously shifted. One end of the conductive terminals 32 is constantly and electrically connected to the corresponding contact c while the other end thereof is electrically connected to one of the contacts a, b. In this embodiment, n is 4. That is, four charging circuits and four switching units are provided, but the number thereof should not be limited thereto.

A charging control circuit A is comprised of a contact a and a contact c of the charging/discharging control unit 40 and electrically coupled to the input power source 20 for controlling the ON/OFF of the input power source 20 or outputting a charging power to the charging block 12.

A discharging control switch E comprises an input terminal d, an output terminal e and a control terminal f, wherein the input terminal d is coupled to a positive terminal of the first charging compartment 121 in the charging block 12. That is, it is connected to the positive terminal 12a of the first charging compartment C1. The output terminal e is coupled to a voltage regulator circuit 50, and the control terminal f is electrically coupled to the contact b of the charging/discharging control unit 40 for controlling the ON/OFF of the input terminal d and the output terminal e, such that the series-connected and combined discharging current Id of each battery B1~Bn in the charging block 12 is outputted to the voltage regulator circuit 50. The discharging control switch E is a mechanical switch or an electronic switch linked to the contact b of the charging/discharging control unit 40, and the discharging control switch E is coupled to the voltage regulator circuit 50 externally or built in the voltage regulator circuit 50.

The voltage regulator circuit 50 is used for boosting or stepping down an input power to a predetermined DC voltage.

At least one USB output port 60 is coupled to an output terminal of the voltage regulator circuit 50, and a socket of the USB output port 60 is exposed from the casing 11.

When the synchronous changeover switch module 30 is switched to a charging mode, all n sets of switching units $SW_1$~$SW_n$ synchronously turn each of the contacts c and each of the contacts a ON, such that the battery B1~Bn on each the charging circuit 121~124 is in an independent separate charging mode, and synchronously control the discharging control switch E to OFF and the charging control circuit A to ON, such that each battery is charged by the charging current Ic. When the synchronous changeover switch module 30 is switched to a discharging mode, all n sets of switching units $SW_1$~$SW_n$ synchronously turn each of the contacts c and each of the discharging contacts b ON, such that the battery B1~Bn on each charging circuit is in a series-connected and combined discharging mode, and synchronously turn the charging control circuit A OFF and turn the discharging control switch E ON, such that each series-connected battery outputs a discharging current Id, so as to form a single an independent separate charging or a series-connected and combined discharging between charging and discharging circuits by the synchronous changeover switch module 30 and synchronously control the ON/OFF of the charging current Ic and the discharging current Id.

Figure 8A:
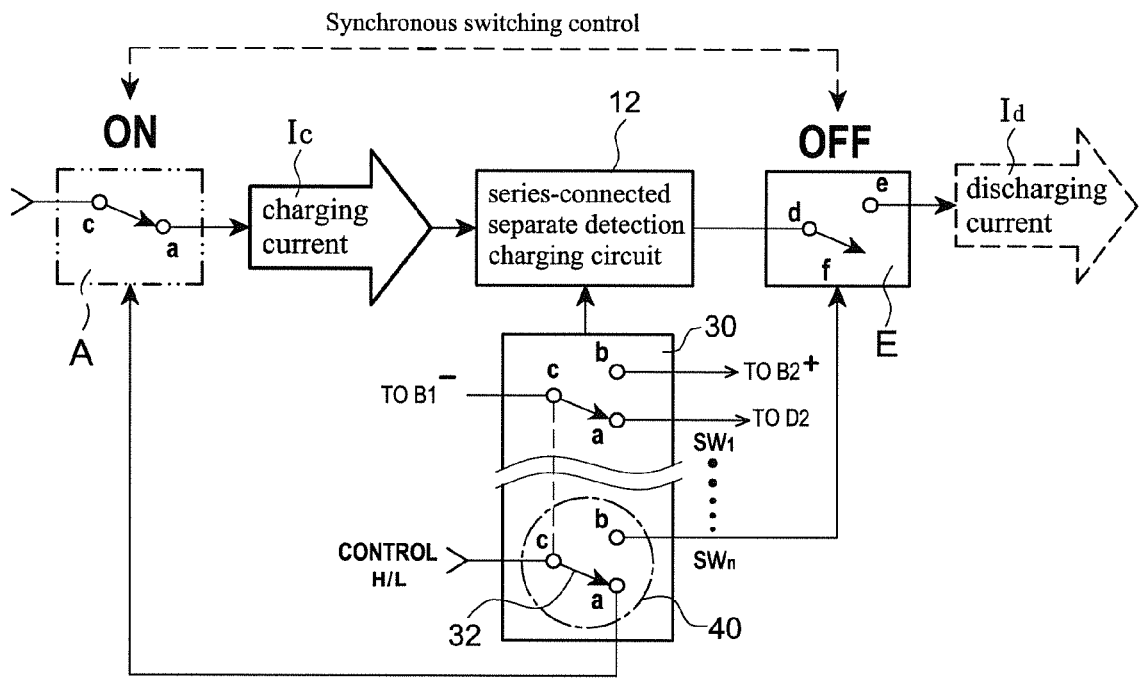
FIG. 8A is a schematic circuit diagram of a charging control of the present invention.

In this preferred embodiment, the switching unit $SW_n$, n=4 at the bottom is used as the charging/discharging control unit 40. In this switching unit $SW_n$, the contact b is coupled to the discharging control switch E, and each contact b of the remaining switching units $SW_1$~$SW_3$, is electrically coupled to a positive terminal of the batteries B2~B4 of the next charging circuit 122~124. In this way, when the synchronous changeover switch module 30, as shown in FIGS. 8A and 9A, is switched downward by the insulated operating interface 31, the conductive terminal 32 at the contact c is forced to shift downward synchronously. Now, the charging circuits 121~124 create a charging circuit in series.

Figure 5B:
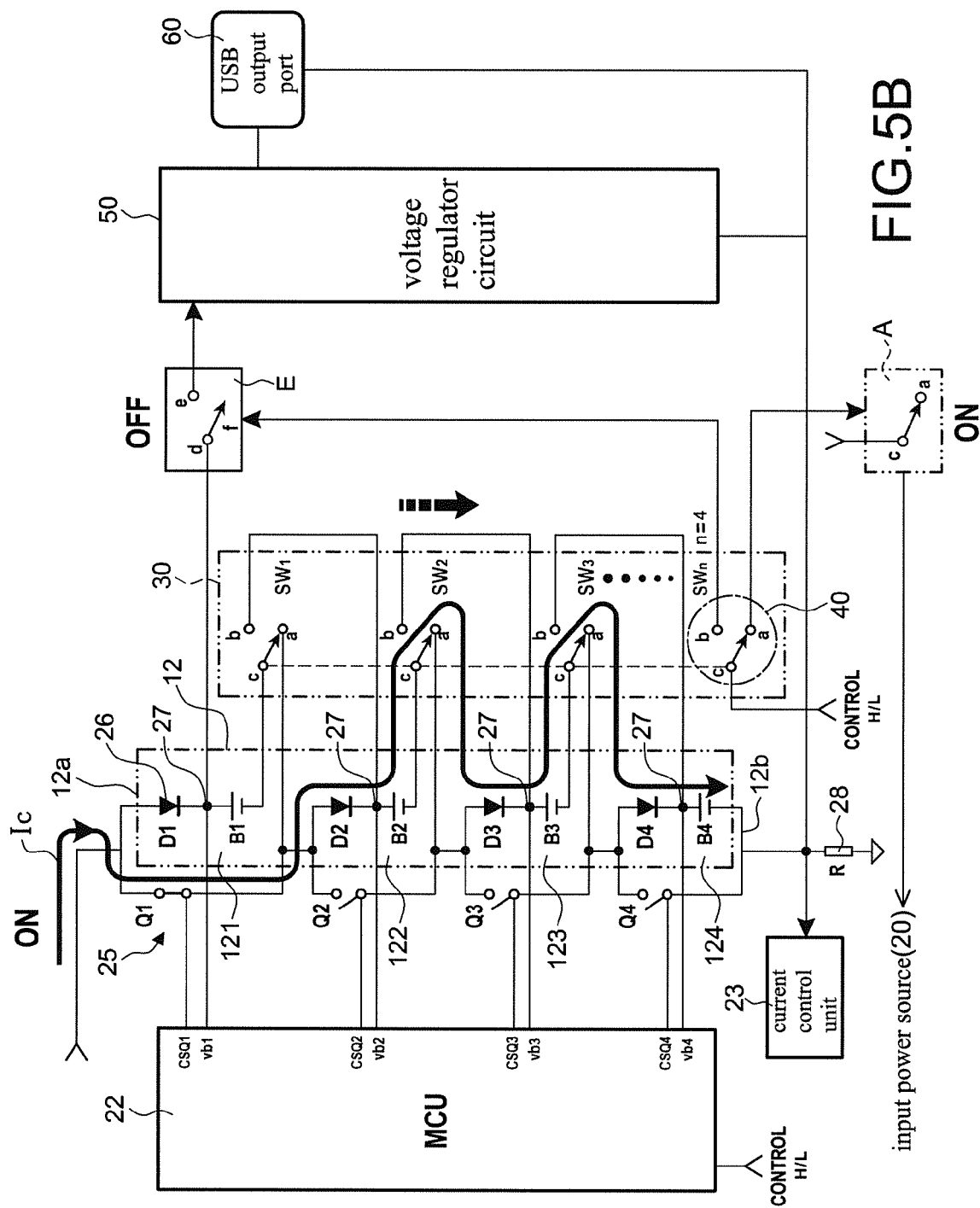
FIG. 5B is a schematic circuit diagram II the present invention in a separate detection mode.
Figure 5C:
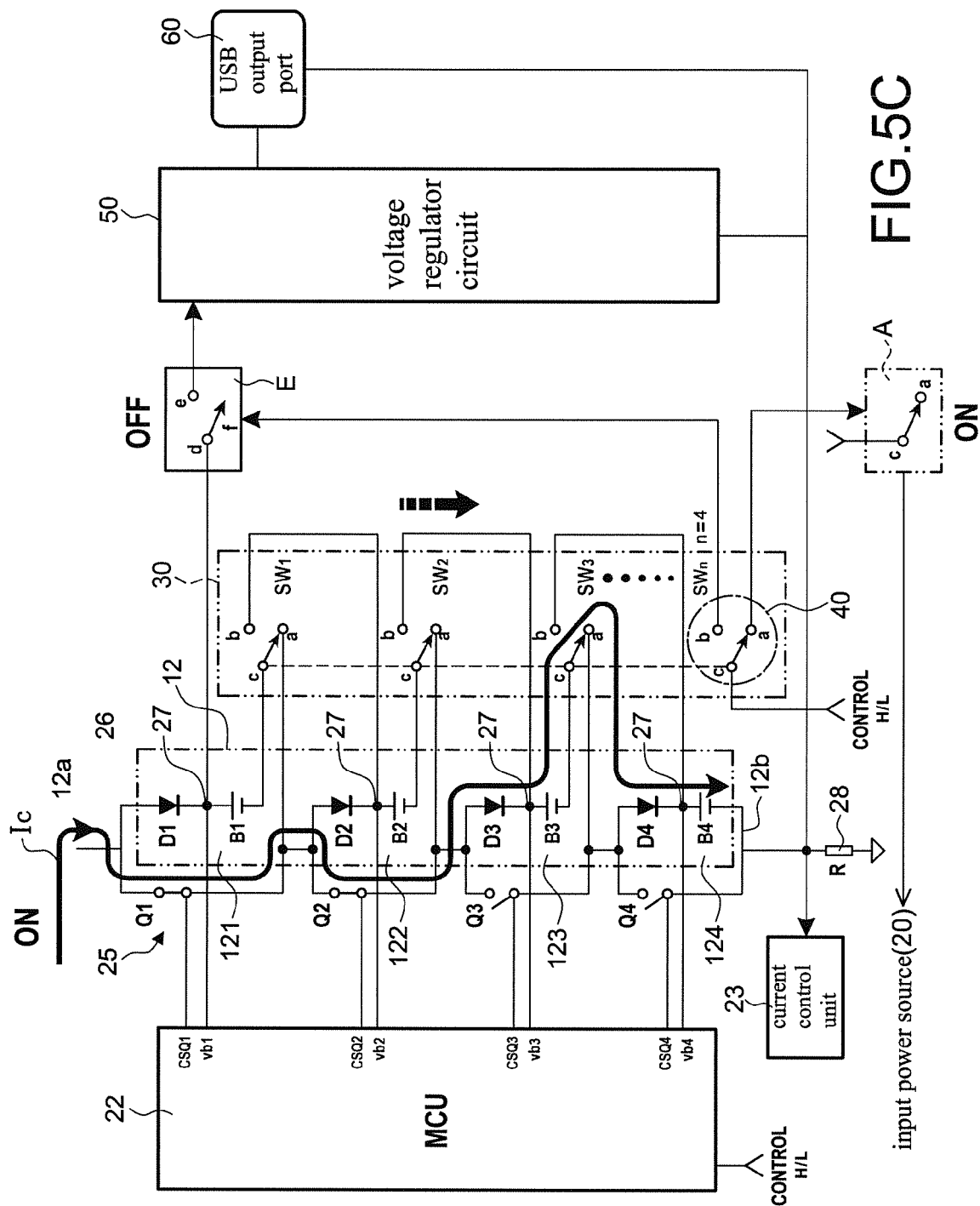
FIG. 5C is a schematic circuit diagram III the present invention in a separate detection mode.
Figure 5D:
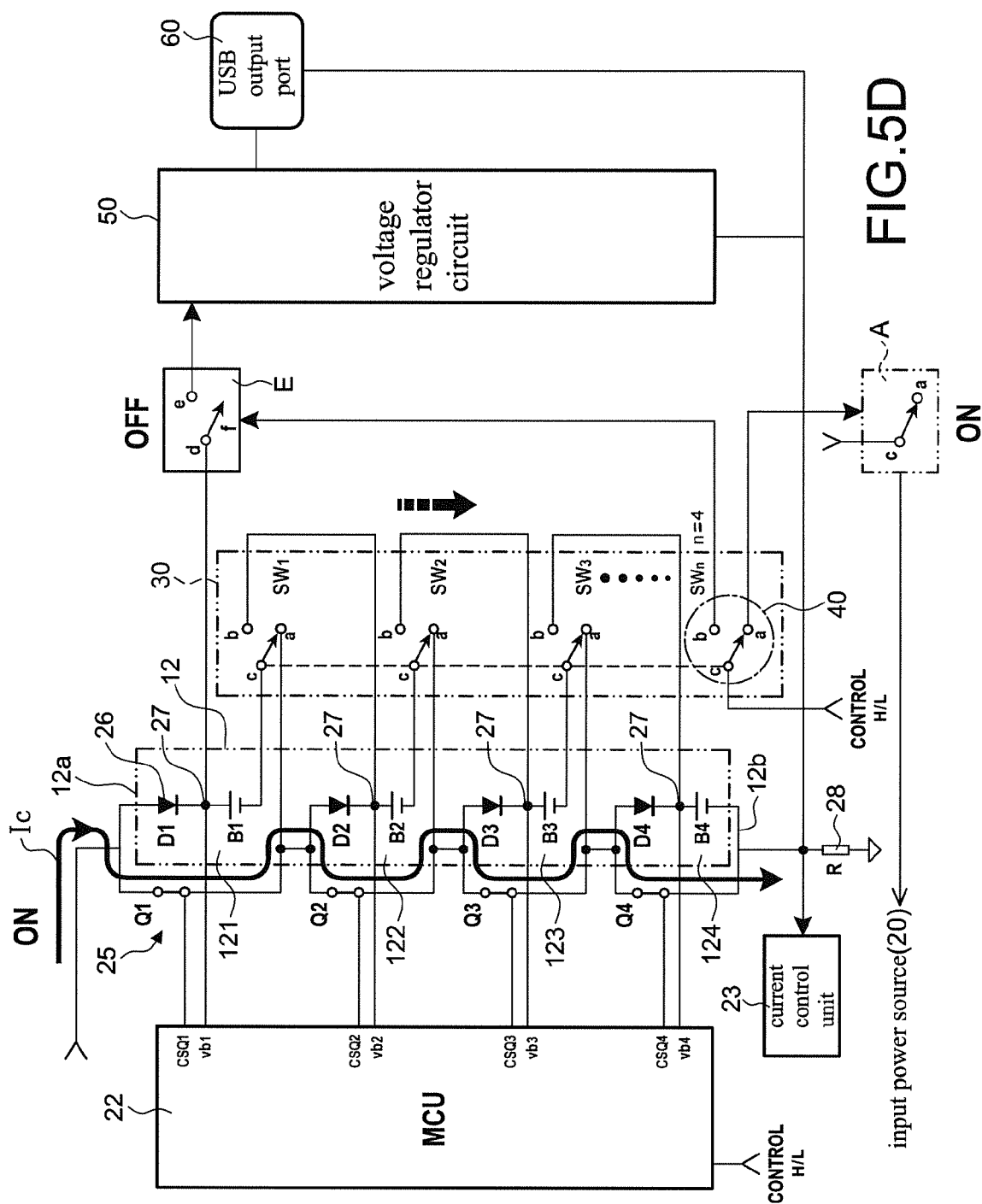
FIG. 5D is a schematic circuit diagram IV the present invention in a separate detection mode.

FIGS. 5A~5D illustrate the series charging arrangement in accordance with the invention. FIG. 5A shows the circuit to charge four batteries B1~B4 in the charging block 12 by the charging current Ic. Q1~Q4 of the switch element 25 are all switched in the OFF state. Therefore, the flow direction of the charging current Ic is shown in the drawing. The charging current Ic flows through each of the series batteries B1~B4. When the battery B1 is fully charged, the control IC 22 detects the charging voltage at the detection point 27 as LOW such that the first switch element Q1 is switched ON. At this time, the charging current Ic is shown in FIG. 5B. The battery B1 won't be charged by the charging current Ic again. The charging current Ic flows downward for a further charging process. When the battery B2 is fully charged, the switch element Q2 of the charging circuits 122 is switched ON (see FIG. 5C), and so on. When all of the batteries B1~B4 are fully charged (see FIG. 5D), all of the switch elements Q1~Q4 are switched ON. Meanwhile, the charging current Ic can be adjusted by the current detection component 28 for slightly charging all of the batteries. The batteries B1~B4 of the invention are connected in series for charging. At the same time, each of the batteries B1~B4 has a separate detection circuit. Only the separate detection way for the charged batteries can make sure if each of the batteries is really charged in a full capacity. Meanwhile, an excessive charging or a non-full charging can be prevented. Moreover, the series charging with separate detection ensures a better charging efficiency. Therefore, the invention is a continuation of the feature of the previous invention. That is, the charging circuits 121~124 are instantly and synchronously combined in a discharging circuit by the synchronous changeover switch module 30 when the batteries B1~B4 in the charging block 12 are fully charged. In this way, the stored electric energy can be effectively released for use.

Figure 6A:
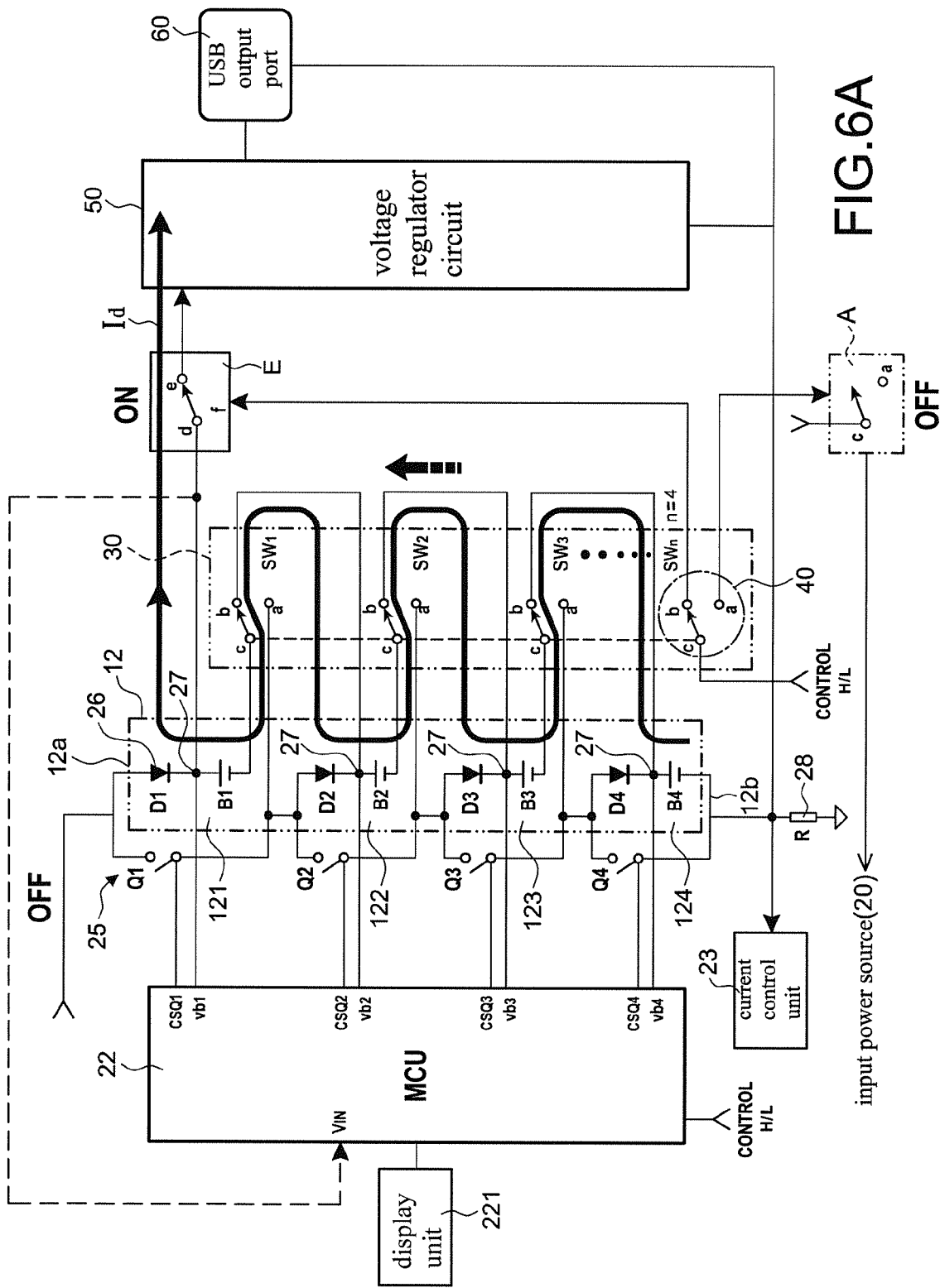
FIG. 6A is a schematic circuit diagram showing four series-connected discharging circuits in accordance with the present invention.
Figure 6B:
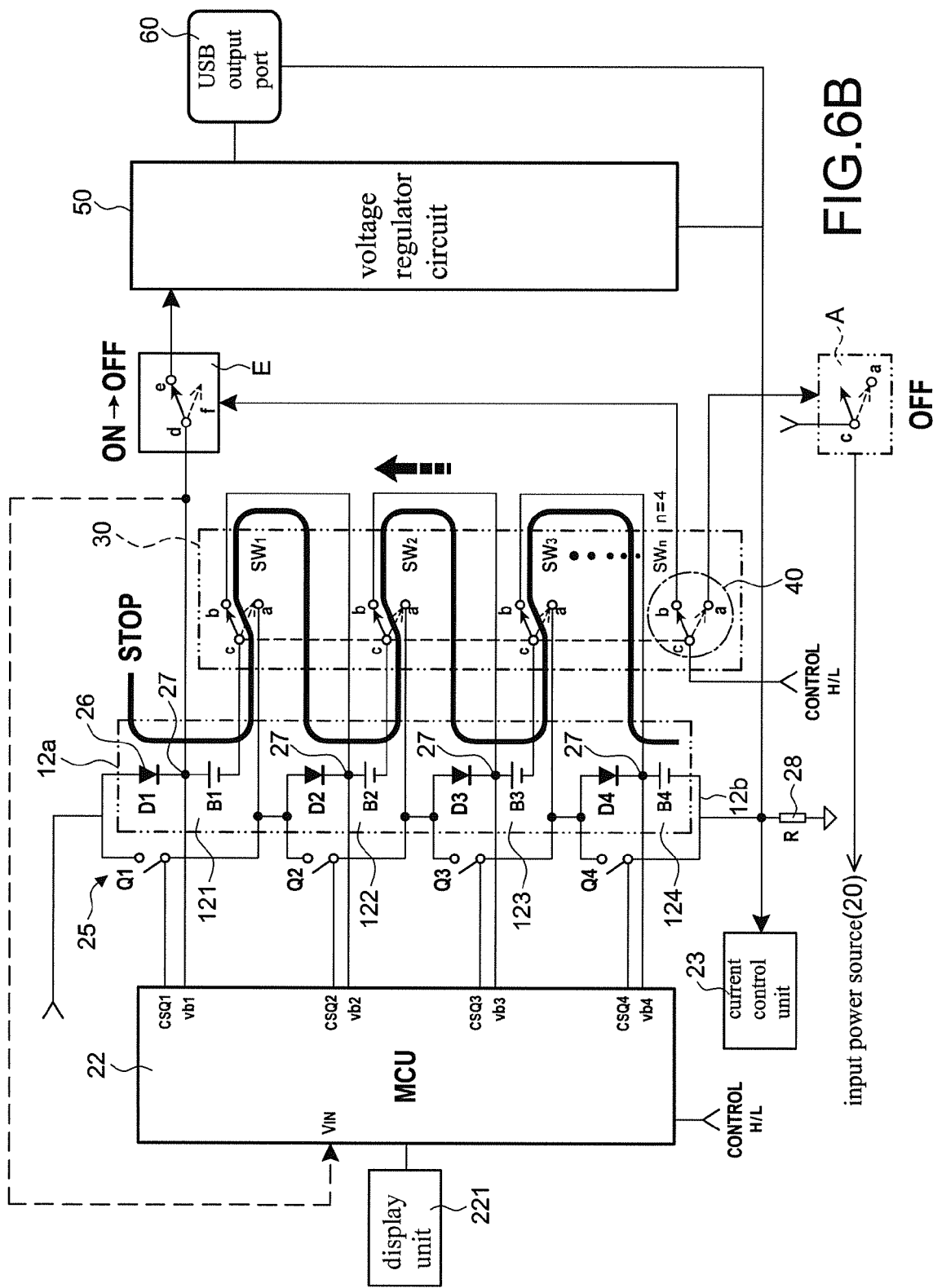
FIG. 6B is a schematic circuit diagram showing the termination of the discharging process in accordance with the present invention.

In discharging the fully charged batteries B1~B4 in the charging circuits 121~124 (see FIGS. 6A and 9B), the synchronous changeover switch module 30 can be switched upward. Meanwhile, the exposed isolation operation interface 31 shown in FIG. 3 has to be moved in the other side. At this point, the conductive terminal 32 at the contact c is synchronously moved upward to be electrically connected to the contact b of the switching units SW1~SW4. Now, the batteries B1~B4 in the charging block 12 are connected in series and combined in a discharging circuit. Meanwhile, the discharge control switch E is switched ON for output of the discharging current Id. In order to prevent an excessive discharge of the batteries B1~B4 which cause the reduction of the battery life, the discharge termination voltage of the batteries B1~B4 can be detected by the control IC 22 just before the discharging process is ended. In this way, the discharge control switch E can be switched OFF to stop the discharging process. The electrical energy stored in the form of the direct current (DC) in the batteries B1~B4 can be delivered to the control IC 22 (see FIGS. 6A and 6B) when the discharging process is conducted in the absence of the input power source 20. The control IC 22 can be activated by low voltage for checking the discharge termination voltage. Therefore, the discharging state or the warning state can be shown by the display unit 221, too. As a result, the discharge termination voltage can also be detected even in the absence of the input power source 20 when the charger 10 in accordance with the invention is in the discharging state. Thus, the discharging process can be terminated for ensuring the service life of the batteries.

The input terminal of the voltage regulator circuit 50 is coupled to the output terminal 42 of the discharging control switch E for regulating the voltage of the discharging current Id. In this preferred embodiment, the voltage regulator circuit 50 is a synchronous buck/boost DC/DC converter, and the buck/boost IC technology of this sort has been used extensively, and can provide a stable and accurate voltage output, and its internal circuit is a prior art and thus will not be described in details here.

Since four pieces of nickel metal hydride/cadmium secondary batteries B1~B4 connected in series can only provide a voltage of 1.2V×4=4.8V which is still below the standard USB power output of DC 5.0V, therefore it is necessary to step up the voltage. Since the voltage of the alkaline primary battery is 1.5V, and four of them provide a total voltage of 6V, therefore the discharging current is different from the secondary battery and requires stepping down the voltage from 6V to 5V. On the other hand, the present invention adopts the foregoing voltage regulator circuit 50 that can discharge, step up, step down or regulate the voltage the voltage for different batteries, so as to assure that the electric power supply from the USB output port 60 has a stable and accurate voltage.

Figure 8B:
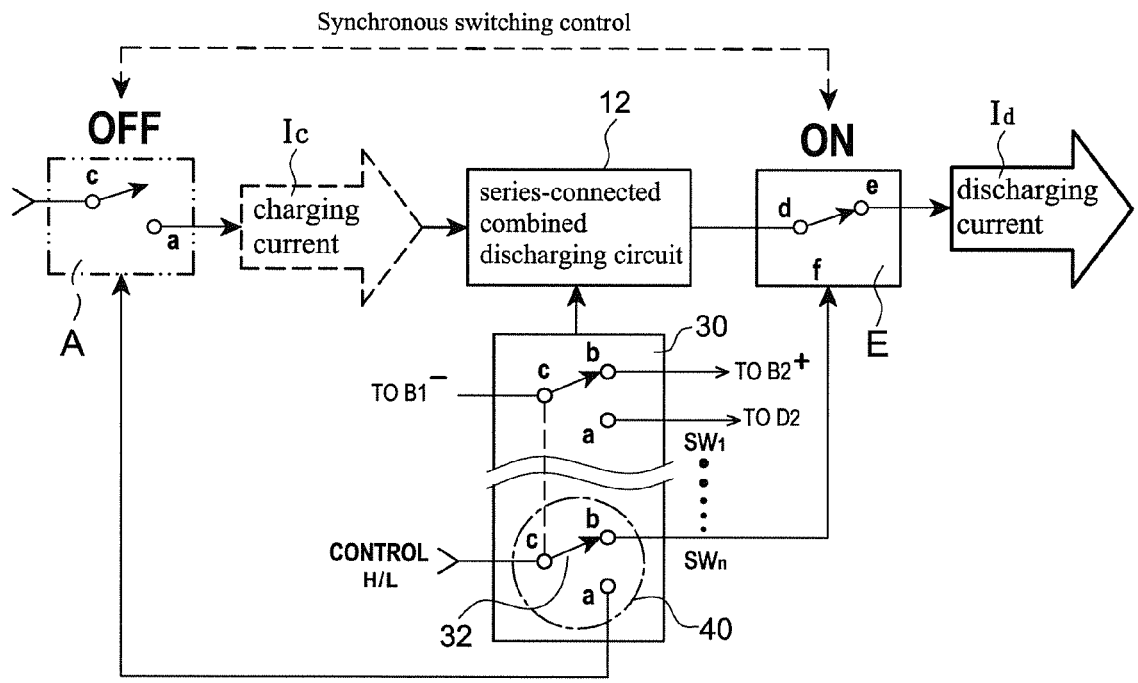
FIG. 8B is a schematic circuit diagram of a discharging control of the present invention.

With the foregoing technical measures and controls as shown in FIGS. 8A and 8B, the $n^{th}$ set of switching unit $SW_n$ of the synchronous changeover switch module 30 is used as the charging/discharging control unit 40, and its contact a is provided for turning on the charging control circuit A, and the contact b is provided for turning on the discharging control switch E, which form a control with two opposite functions. In other words, when the synchronous changeover switch module 30 is switched to the charging mode, the contact c and the contact a of each switching unit $SW_1$~$SW_n$ are ON, such that each battery in the charging block 12 is an independent separate charging circuit, and the charging control circuit A is ON to allow the charging current Ic to enter into the charging block 12, while the discharging control switch E is turned OFF automatically to situate at a charging status as shown in FIG. 8A. On the other hand, when the synchronous changeover switch module 30 is switched to the discharging mode as shown in FIG. 8B, the contact c and the contact b of each switching unit $SW_1$~$SW_n$ are ON, and each battery in the charging block 12 is a series-connected and combined discharging circuit, and the charging control circuit A is turned OFF, and the discharging control switch E is turned ON to output the discharging current Id. In the present invention, a charging/discharging circuit and a switch is provided for a synchronous switching control, such that when the charging block 12 charges the battery, the output of discharging current Id is turned off automatically, so as to avoid interference to the output circuit or prevent affecting the charging process. During the discharging process, the charging circuit is disconnected automatically to avoid interference to the discharging process. In a preferred embodiment, the charging control circuit A and the discharging control switch E are coupled to the contact a and the contact b of the charging/discharging control unit 40 respectively for the control, wherein the contacts a, c of the charging/discharging control unit 40 are the contacts a, c of the charging control circuit A in this preferred embodiment, and the contact b is electrically coupled to the discharging control switch E. With the electric connection, if the contacts a, c are ON, the charging control circuit A will be ON. If the contacts b, c are ON, a signal will be transmitted to the discharging control switch E to turn the charging control circuit A ON. As a result, the charging/discharging control unit 40 is used as a press button on the control IC 22 for controlling the charging/discharging function. As to the charging control circuit A and the discharging control switch 40B, they are not limited to those illustrated in the figures only, but any method capable of switching the contacts a, b of the charging/discharging control unit 40 ON/OFF synchronously can be adopted. Since the contacts a, b will not be turned ON at the same time, but they are in opposite control state, therefore one of the contact is ON, while the other one is OFF. The present invention applies this technical measure to achieve the switching purpose conveniently, so that the present invention can integrate several functions into the same charger without increasing the overall volume or the complicity of the structure.

The present invention skillfully uses the synchronous changeover switch module 30 to achieve the aforementioned features of "independent separate charging and series-connected and combined discharging" and "a one-time control for switching to a charging mode and a discharging mode synchronously".

Therefore, a preferred embodiment of the present invention may have n sets of charging circuits in the charging block, wherein n is equal to 2, 4 or 8, and n−1 sets of switching units $SW_1$~$SW_{n-1}$ corresponding to the manual switch 30 include 1 set, 3 sets or 7 sets, and the last $n^{th}$ set of independent switching unit $SW_n$ may be added to the 1 set, 3 sets or 7 sets to serve as the charging/discharging control unit 40.

In FIG. 4, the present invention can connect an auxiliary power supply 70 to the voltage regulator circuit 50 by the input power source 20 and output a standard USB power from the USB output port 60 after the voltage is stabilized.

Figure 10:
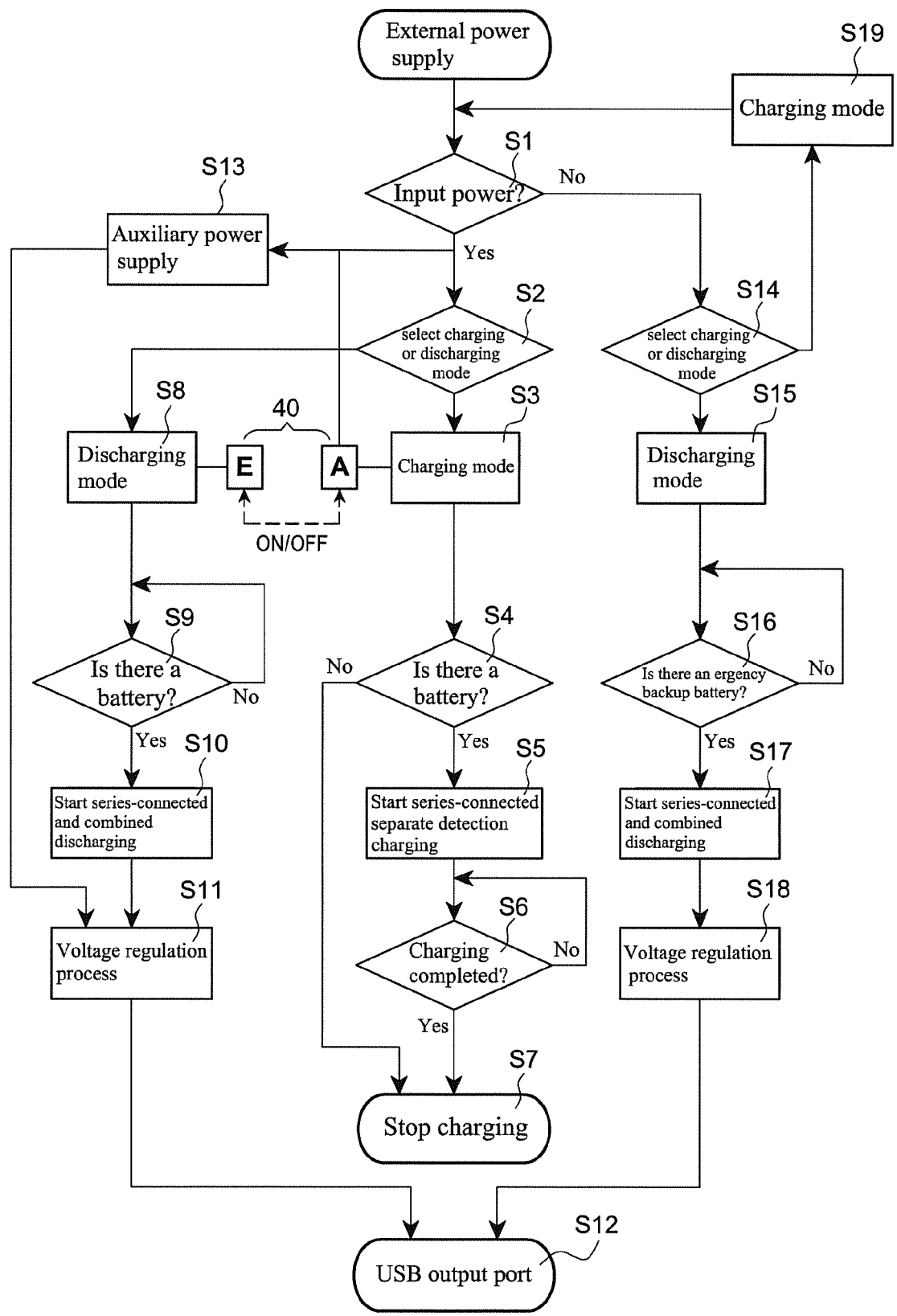
FIG. 10 is a flow chart of an operating procedure of the present invention.

With FIG. 10 for a flow chart of an operating procedure for controlling the control IC 22 in accordance with a preferred embodiment of the present invention, Step S1 determines whether or not there is an input power source 20, and Step S2 determines whether or not the manual switch 30 is switched to a charging mode or a discharging mode, if there is an input power source 20, and Step S3 sets the battery in the charging block 12 to an independent separate charging circuit mode if Step 2 determines that the manual switch is in a charging mode. Now, the charging/discharging control unit 40 synchronously turn the discharging control switch E OFF and the charging control circuit A ON to set a charging mode, and then Step S4 determines whether or not there is a rechargeable battery in the charging block 12.

Step 5 turns on an independent separate charging circuit if Step 4 determines that there is a rechargeable battery, and step S6 determines whether or not the charging is completed, and will continue charging when not completed, or else enter into Step S7 to stop charging the battery. Of course, a slight charging may be performed after the charging process ends, and the details will not be described here.

In the foregoing Step S2, if it is determined that the manual switch 30 is switched to the discharging mode, Step 8 will take place. Now, the charging/discharging control unit 40 synchronously turns the charging control circuit A OFF, the input power source 20 OFF, and the discharging control switch E ON to set it at a discharging mode. Step S9 determines whether or not there is a battery, and Step 10 takes place to start the series-connected and combined discharging circuit if there is a battery in the charging block 12, such that each battery is series-connected and discharged. For a secondary battery of a lower voltage (4.8V), Step S11 will regulate the voltage by a voltage regulator circuit 50. For a primary battery with a higher voltage (6V), Step S11 will step down the voltage. The step-up and step-down of the voltage in Step S11 is performed by the voltage regulator circuit 50, and Step S12 output a stable electric power with a standard USB voltage of DC 5.0V to an external electronic product.

In the foregoing Step S1, if it is determined that there is no input power source 20, the procedure will enter into S14 to determine whether or not the manual switch 30 is switched to a discharging mode or a charging mode, and if it is determined that the manual switch 30 is switched to the charging mode, then the procedure ends. If it is determined that the manual switch 30 is switched to the discharging mode, then Step S15 takes place. Now, the circuit in charging block 12 is a series-connected discharging circuit, and an emergency backup battery can be placed into the charging block 12. Step S16 determines whether or not there is a battery in the charging block 12, and step S17 takes place if there is a battery in the charging block 12, and then the Steps S17~S18 are the same as the Steps S10~S11, and finally Step S12 outputs an electric power of standard voltage from the USB output port 60.

In the foregoing Step S1, if it is determined that there is an input power source 20, another procedure takes place at the same time of S2, wherein the input power source 20 is inputted directly to the auxiliary power supply 70 of Step S13, and the auxiliary power supply 70 stabilize the voltage in Step S11 and enters into Step S12 to output an electric power of a standard voltage from the USB output port 60. When the auxiliary power supply 70 supplies electric power, the discharging mode of Step S8 is disabled.

Figure 11:
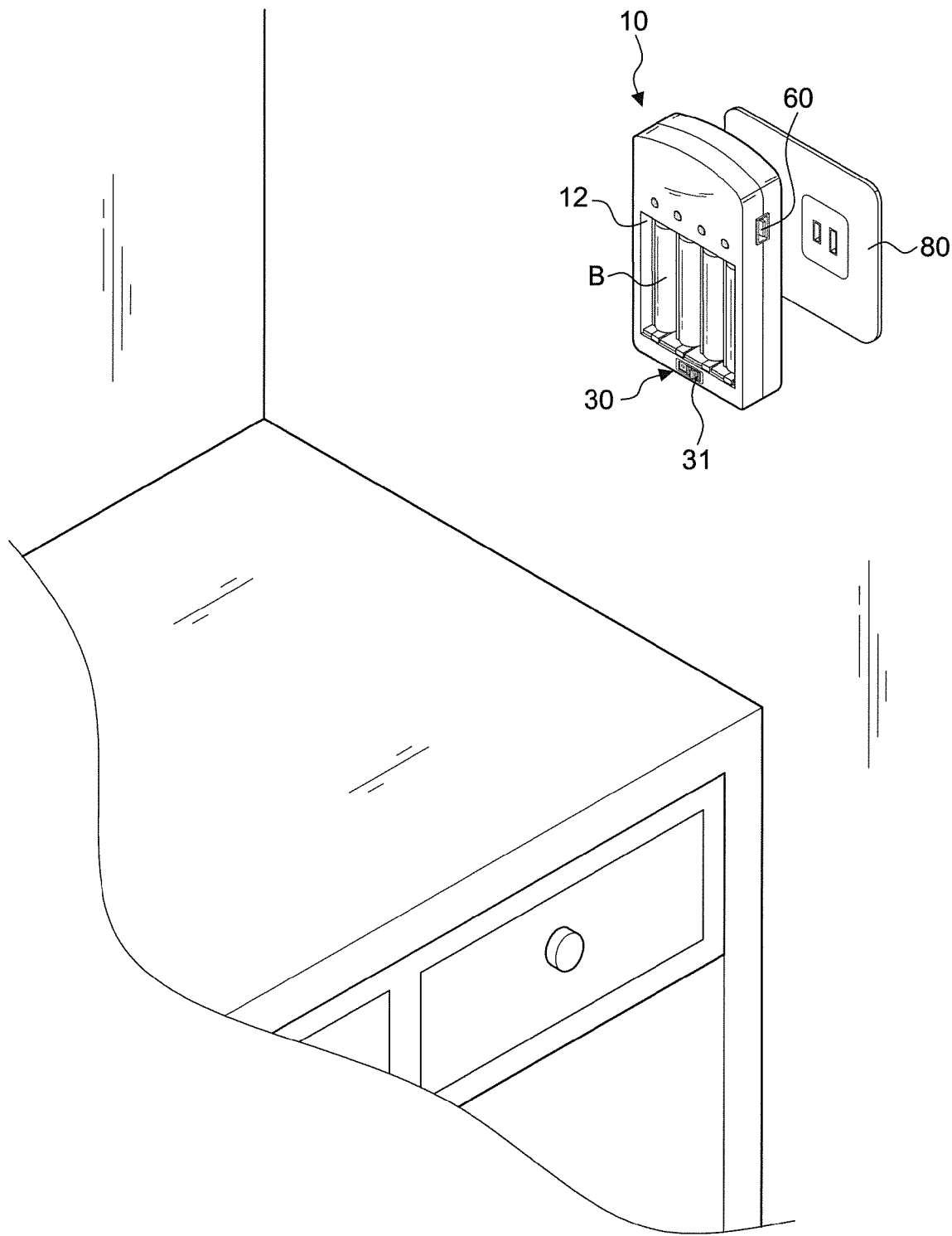
FIG. 11 is a schematic view of an application of the present invention, showing a charger connected to an external power source.
Figure 12:
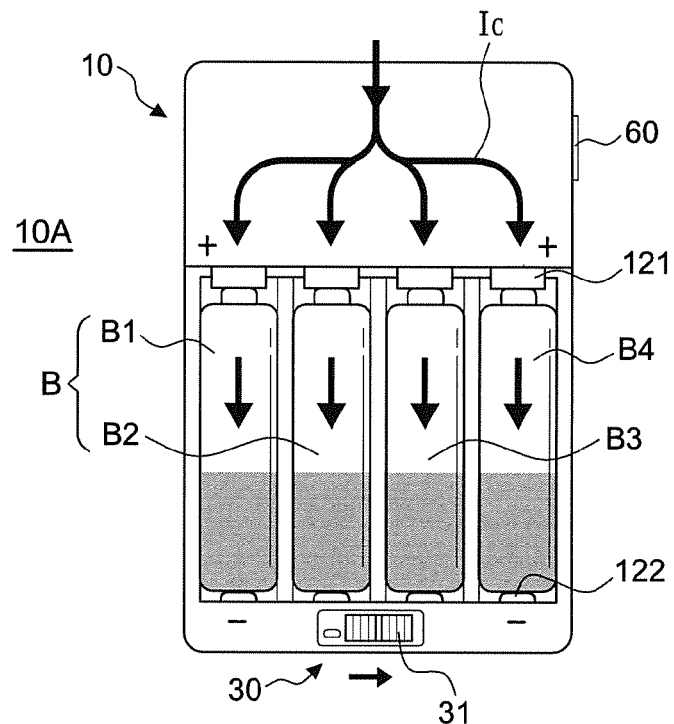
FIG. 12 is a schematic view of an application as a charger in accordance with the present invention.
Figure 13:
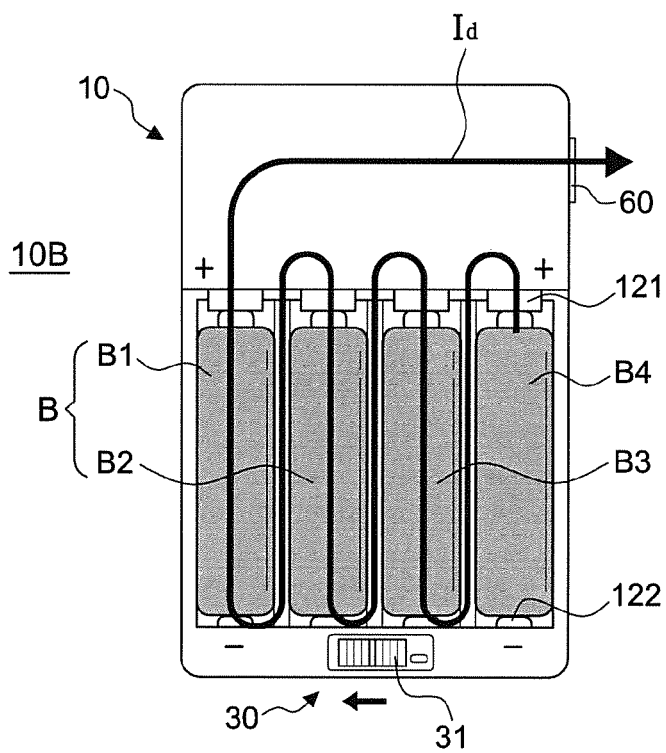
FIG. 13 is a schematic view of an application as a discharger in accordance with the present invention the present invention.
Figure 14:
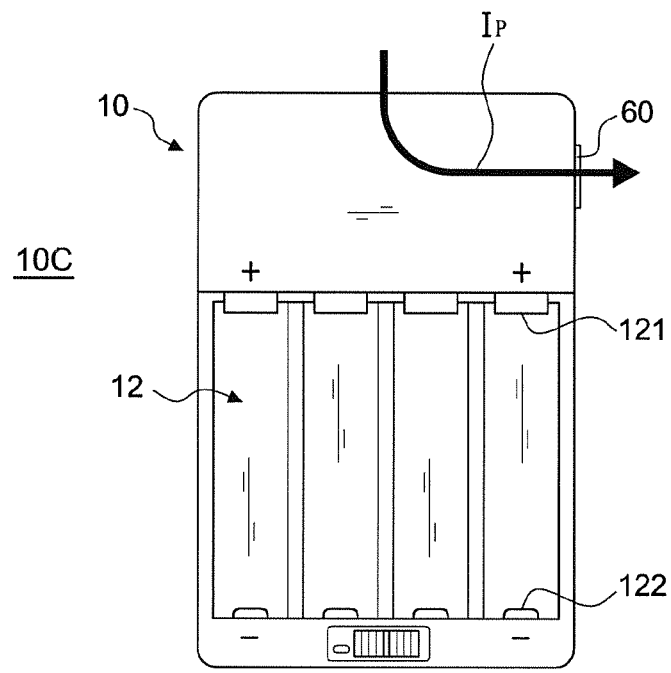
FIG. 14 is a schematic view of an application as an adaptor in accordance with the present invention the present invention.
Figure 15:
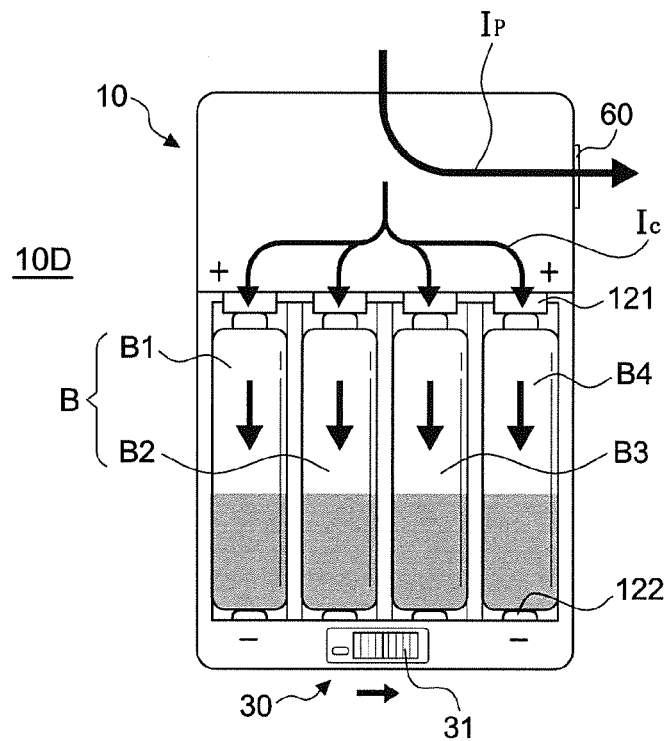
FIG. 15 is a schematic view of an application as an adaptor and a charger concurrently in accordance with the present invention the present invention.

According to the aforementioned control procedure, the charger 10 of the present invention can be used with the following modes:

(a) Under the condition of having an external power source:

i) When the synchronous changeover switch module 30 is switched to a charging mode, each charging circuit 121~124 for a plurality of rechargeable batteries B in the charging block 12 is an independent/separate detection charging circuit in series, and the charging/discharging control unit 40 synchronously turns the charging control circuit A ON and the discharging control switch E OFF, so as to form a battery charger 10A. In the applications as shown in FIGS. 11 and 12, when the present invention is used as a charger, one or two batteries can be charged.

ii) When the synchronous changeover switch module 30 is switched to a discharging mode, each battery B1~B4 of the charging block 12 is a series-connected and combined discharging circuit, and the charging/discharging control unit 40 synchronously controls the charging control circuit A to OFF and the discharging control switch E to ON, such that the series-connected discharging current Id is regulated by the voltage regulator circuit 50 to supply the required electric power from the USB output port 60, so as to form a discharger 10B, and this application is shown in FIG. 13.

iii) If the battery in the charging block 12 is low or there is no battery in the charging block 12 as shown in FIG. 14, the auxiliary power supply 70 can directly supply a current Ip through the voltage regulator circuit 50, and then to the USB output port 60, such that the charger 10 becomes an adaptor 10C under the condition of having an output power source 20. In FIG. 15, when the charger 10 charges each battery B in the charging block 12, an electric power is supplied to the USB output port 60 at the same time, such that the charger becomes an adaptor/charger 10D without affecting the power supply of the electronic product during the charging process.

Figure 16:
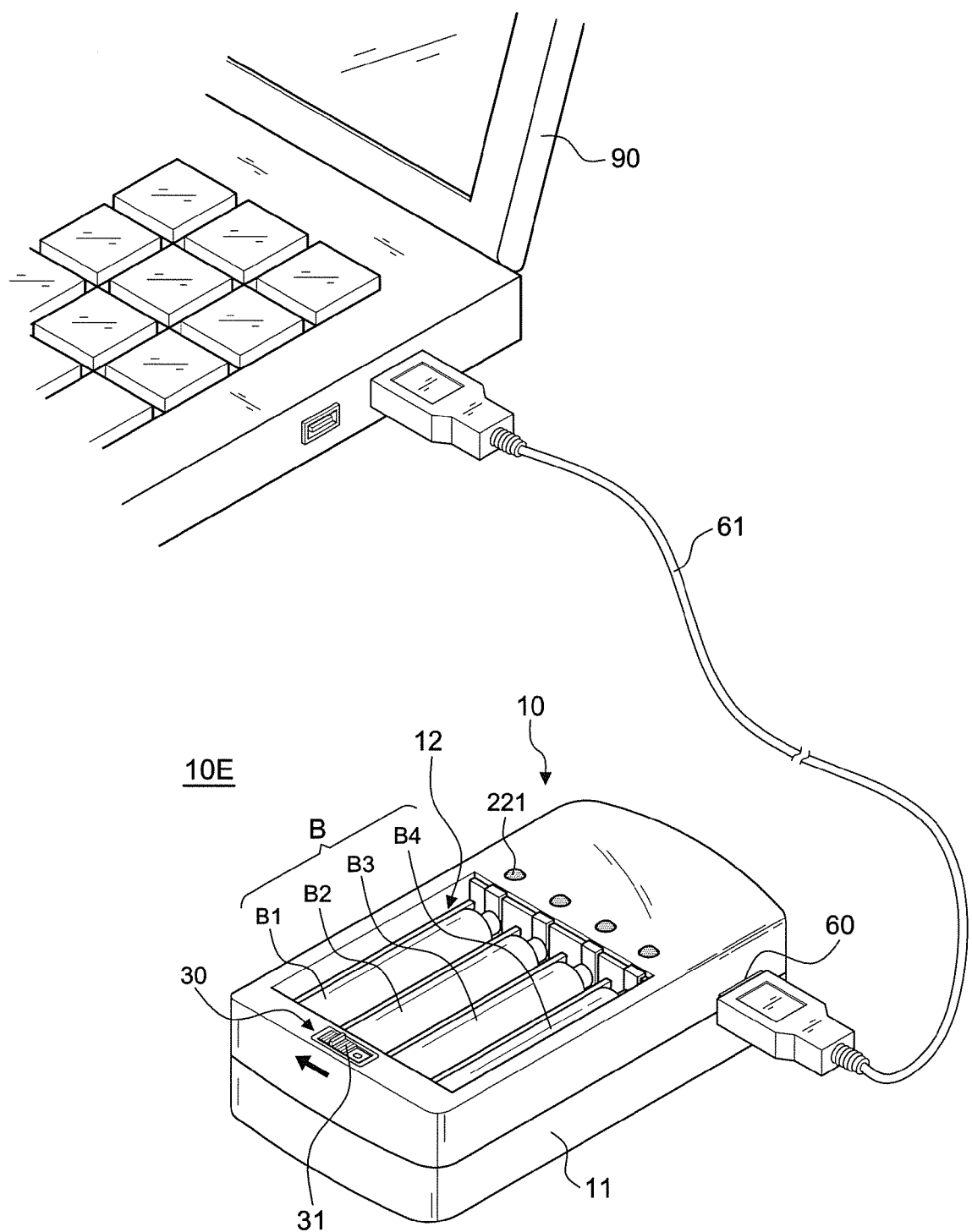
FIG. 16 is a schematic view of an application as a portable power in accordance with the present invention.

(b) Under the condition of having an external power source:

i) When the synchronous changeover switch module 30 is switched to the charging mode, there is no charging current for each charging circuit 26. Now, the charger 10 is not in use.

ii) When the synchronous changeover switch module 30 is switched to the discharging mode, a charged backup secondary battery or primary battery B1~B4 in the charging block 12 is a series-connected and combined discharging circuit, and the charging/discharging control unit 40 synchronously controls the discharging control switch E to ON, such that the voltage of the series-connected discharging current Id can be regulated by the voltage regulator circuit 50, and the required electric power supplied from the USB output port 60 can be outputted to a portable electronic product 90 through a transmission cable 61, so as to form a portable power or an emergency power supply 10E, and this application is shown in FIG. 16.

In summation, the present invention uses a manual switch to integrate the features of an "independent separate charging circuit" and a "series-connected and combined discharging circuit" to synchronously control the ON/OFF of the charging and discharging circuits in the same charging block. The invention not only provides a convenient operation, but also overcomes the shortcomings of the conventional charger and achieves the effects of enhancing the charging and discharging performance, and integrating several functions into the same charger to improve its practicability.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims

What is claimed is:

1. A series battery charger with a circuit for a series battery charging process and for a series combined synchronous discharging process, comprising:

a casing, for containing a charging component, and having a charging block disposed on a surface of the casing, a plurality of charging compartments formed in the charging block for placing a plurality of batteries respectively, and a first end of the charging compartment being a positive terminal, and a second end of the charging compartment being a negative terminal, and the casing having a plug connectable to an external power source;

an input power source provided for converting an AC or DC power from the external power source to a DC power and supplying a reference voltage source to a control integrated circuit (IC), a current control unit and a voltage control unit being interposed between an input terminal of the control IC and the input power source, thereby creating a first charging circuit for charging the batteries in the charging block;

the batteries within the charging block connected in series, each of the batteries is connected to a second charging circuit in parallel with a switch element, an anti-adverse-current element being interposed between the switch element and a positive terminal of each battery, wherein the control IC separately applies a terminal voltage to the positive terminal of each of the batteries for the purpose of detection such that each switch elements is switched ON as each battery is fully charged, whereby a charging current (Ic) can be used for a further charging process of partially charged batteries;

a synchronous changeover switch module provided for switching each second charging circuit in a series charging mode or a discharging mode, the synchronous changeover switch module having a number of interposed switching units, wherein each interposed switching unit is respectively interposed between two series-connected second charging circuits, and wherein a last switching unit of the synchronous changeover switch module is an independent charging/discharging control unit, and wherein each of the interposed and last switching units has three contacts, and wherein a first contact of the interposed switching units is connected to the switch element of the corresponding second charging circuit and to the front end of the anti-adverse-current element of an adjacent second charging circuit, and wherein a second contact is respectively connected to the positive terminal of the battery of the adjacent second charging circuit, and wherein a third contact is electrically connected to the negative terminal of the battery of the corresponding second charging circuit, and wherein a first contact of the last switching unit serving as the charging/discharging control unit is a charging control terminal while a second contact of the last switching unit is a discharging control terminal, and a third contact of the last switching unit is a power control terminal (CONTROL H/L) for connection to the input power source or for grounding, and wherein the third contact of the last switching unit is electrically connected to one of the first or second contacts of the last switching unit when the synchronous changeover switch module is switched to one of the charging and discharging modes;

a charging control circuit, composed of a first contact and a second contact of the charging/discharging control unit, and electrically coupled to the input power source, for controlling the ON/OFF state of the input power source or outputting a charging power to the charging block;

a discharging control switch, comprising an input terminal, an output terminal and a control terminal, and the input terminal being coupled to a positive of the second charging circuit/compartment in the terminal the charging block corresponding to the first battery, and the output terminal being coupled to a voltage regulator circuit, and the control terminal being electrically coupled to a third contact of the charging/discharging control unit, for controlling the ON/OFF state of the input terminal and the output terminal, such that a series-connected and combined discharging current of each battery in the charging block is outputted to the voltage regulator circuit; and at least one USB output port, coupled to an output terminal of the voltage regulator circuit;

wherein the voltage regulator circuit boosts or steps down the input power to a predetermined DC voltage;

when the synchronous changeover switch module switches to a charging mode, each third contact and each first contact of all interposed and last switching units are turned to an ON state synchronously, such that each battery on each second charging circuit is in the series-connected separate detection charging mode, and the discharging control switch is turned to the OFF state synchronously, and the charging control circuit is controlled to turn to an ON state to charge each battery by the charging current; and when the synchronous changeover switch module switches to a discharging mode, each third contact and each second contact of all interposed and last switching units are turned to an ON state synchronously, such that each battery on each second charging circuit is in the series-connected combined synchronous discharging mode, and the charging control circuit is turned to the OFF state and the discharging control switch is turned to the ON state synchronously, such that each battery is series-connected to output the discharging current.

2. The series battery charger as recited in claim 1, wherein the charging block has an even number of second charging circuits, up to 8 second charging circuits.

3. The series battery charger as recited in claim 2, wherein the synchronous changeover switch module is constructed as a mechanic type switch or an electronic type switch, and wherein the mechanic type switch can be a slide switch, a press-button switch or a differential switch, and wherein the electronic type switch can be MOSFET or logic circuit while the control IC 22 is used to control the ON/OFF state of the discharge control switch, and wherein the discharge control switch is switched to the OFF state to stop the discharging process when the discharge termination voltage of the batteries is detected by the control IC.

4. The series battery charger as recited in claim 3, wherein each switching unit of the mechanic type switch includes at least three pins, and wherein the synchronous changeover switch module includes a switchable isolation operation interface on the main body thereof, and wherein the isolation operation interface is exposed on the surface of the casing, and wherein, when the isolation operation interface of the mechanical switch conducts the switching process, a plurality of the independent conductive terminals at the bottom thereof is synchronously shifted, and wherein one end of the conductive terminals is constantly and electrically connected to the corresponding third contact while the other end thereof is electrically connected to one of the first and second contacts.

5. The series battery charger as recited in claim 1, wherein the discharging control switch is a mechanical switch or an electronic switch linked with the second contact of the charging/discharging control unit, and the discharging control switch is coupled to the exterior of the voltage regulator circuit or built in the voltage regulator circuit.

6. The series battery charger as recited in claim 1, wherein the operation modes of the charger include:
   a) under the condition of having an external power source:
      i) when the synchronous changeover switch module switches to the charging mode, the plurality of rechargeable batteries in the charging block are series-connected in separate detection charging circuits, and the charging/discharging control unit synchronously controls the charging control circuit to turn to an ON state and the discharging control switch to turn to an OFF state;
      ii) when the synchronous changeover switch module switches to the discharging mode, each battery of the charging block are series-connected in a combined synchronous discharging circuit, and the charging/discharging control unit synchronously controls the charging control circuit to turn to an OFF state and the discharging control switch to turn to an ON state, such that the series-connected discharging current is outputted through the voltage regulator circuit for stabilizing the voltage, and then the USB output port supplies an electric power;
   b) under the condition of having no external power source:
      i) when the synchronous changeover switch module switches to the charging mode, each charging circuit has no charging current, and the charger is in a non-using status; and
      ii) when the manual switch switches to the discharging mode, a charged backup secondary battery or a primary battery installed in the charging block forms a series-connected and combined discharging circuit, and the charging/discharging control unit synchronously controls the discharging control switch to turn to an ON state, such that the series-connected and combined discharging current is stabilized by the voltage regulator circuit, and then the USB output port supplies an electric power to a portable electronic product.

7. The series battery charger as recited in claim 6, wherein the input power source further is further externally coupled to an auxiliary power supply, and the auxiliary power supply is coupled to the voltage regulator circuit for stabilizing the input power source and then supplying the power to the USB output port, such that the charger can charge the batteries concurrently, independently and separately and can output a USB power at the same time, so as to form a dual function device with the functions of a charger and an adaptor, and capable of charging a battery and supplying an electric power to an electronic product concurrently.

8. The series battery charger as recited in claim 6, wherein the input power source is further externally coupled to an auxiliary power supply, and the auxiliary power supply is coupled to the voltage regulator circuit for stabilizing the input power source and then supplying the power to the USB output port, such that if no battery is placed into the charger for charging, a USB power can be supplied to the USB output port, so as to form an adaptor device for supplying an electric power to an electronic product directly.

9. The series battery charger as recited in claim 1, wherein the anti-adverse-current element of the charging circuit is comprised of a diode or a MOSFET, and wherein the switch element connected in parallel with the charging circuit is comprised of a MOSFET.

10. The series battery charger as recited in claim 1, wherein the negative terminal of the charging block comprises a current detection component, and the current detection component is a resistor coupled to the current control unit, and wherein a switch is installed between the input power source and the current and voltage control unit.

* * * * *